(12) United States Patent
Ballin et al.

(10) Patent No.: US 8,977,482 B2
(45) Date of Patent: Mar. 10, 2015

(54) METHOD AND APPARATUS FOR GENERATING FLIGHT-OPTIMIZING TRAJECTORIES

(71) Applicant: The United States of America as represented by the Administrator of the National Aeronautics and Space Administration, Washington, DC (US)

(72) Inventors: Mark G. Ballin, Hampton, VA (US); David J. Wing, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 124 days.

(21) Appl. No.: 13/630,459

(22) Filed: Sep. 28, 2012

(65) Prior Publication Data

US 2013/0080043 A1    Mar. 28, 2013

Related U.S. Application Data

(60) Provisional application No. 61/540,008, filed on Sep. 28, 2011, provisional application No. 61/683,912, filed on Aug. 16, 2012.

(51) Int. Cl.
*G06F 19/00* (2011.01)
*G06G 7/70* (2006.01)
*G06G 7/76* (2006.01)
*G08G 5/00* (2006.01)

(52) U.S. Cl.
CPC ............ *G08G 5/0034* (2013.01); *G08G 5/0078* (2013.01)
USPC ............................................ 701/120; 701/14

(58) Field of Classification Search
CPC ....... G08G 5/00; G08G 5/008; G08G 5/0013; G08G 5/0034; G08G 5/0078; G01C 23/00
USPC ..................................................... 701/120, 14
See application file for complete search history.

(56) References Cited

U.S. PATENT DOCUMENTS

| | | | |
|---|---|---|---|
| 5,379,966 A * | 1/1995 | Simeone et al. | 244/3.11 |
| 5,842,142 A | 11/1998 | Murray et al. | |
| 5,844,503 A | 12/1998 | Riley et al. | |
| 6,389,355 B1 | 5/2002 | Gibbs et al. | |
| 6,744,382 B1 | 6/2004 | Lapis et al. | |
| 7,129,857 B1 | 10/2006 | Spirkovska | |
| 7,818,127 B1 * | 10/2010 | Duggan et al. | 701/301 |
| 7,979,199 B2 | 7/2011 | Judd et al. | |
| 8,380,367 B2 * | 2/2013 | Schultz et al. | 701/3 |
| 8,606,491 B2 * | 12/2013 | Subbu et al. | 701/122 |

(Continued)

*Primary Examiner* — Calvin Cheung
*Assistant Examiner* — Paula L Schneider
(74) *Attorney, Agent, or Firm* — Robin W. Edwards

(57) ABSTRACT

An apparatus for generating flight-optimizing trajectories for a first aircraft includes a receiver capable of receiving second trajectory information associated with at least one second aircraft. The apparatus also includes a traffic aware planner (TAP) module operably connected to the receiver to receive the second trajectory information. The apparatus also includes at least one internal input device on board the first aircraft to receive first trajectory information associated with the first aircraft and a TAP application capable of calculating an optimal trajectory for the first aircraft based at least on the first trajectory information and the second trajectory information. The optimal trajectory at least avoids conflicts between the first trajectory information and the second trajectory information.

24 Claims, 18 Drawing Sheets

(56) References Cited

U.S. PATENT DOCUMENTS

| | | | |
|---|---|---|---|
| 2003/0146853 A1* | 8/2003 | Bolduc | 340/974 |
| 2004/0124998 A1 | 7/2004 | Dame | |
| 2005/0049762 A1 | 3/2005 | Dwyer | |
| 2010/0042273 A1* | 2/2010 | Meunier et al. | 701/9 |
| 2011/0313598 A1* | 12/2011 | Coulmeau et al. | 701/3 |
| 2012/0158219 A1* | 6/2012 | Durling et al. | 701/4 |
| 2012/0158278 A1* | 6/2012 | Peinecke et al. | 701/120 |
| 2012/0215384 A1* | 8/2012 | Fritz | 701/2 |
| 2013/0006533 A1* | 1/2013 | Lax et al. | 702/3 |
| 2013/0238170 A1* | 9/2013 | Klinger | 701/3 |

* cited by examiner

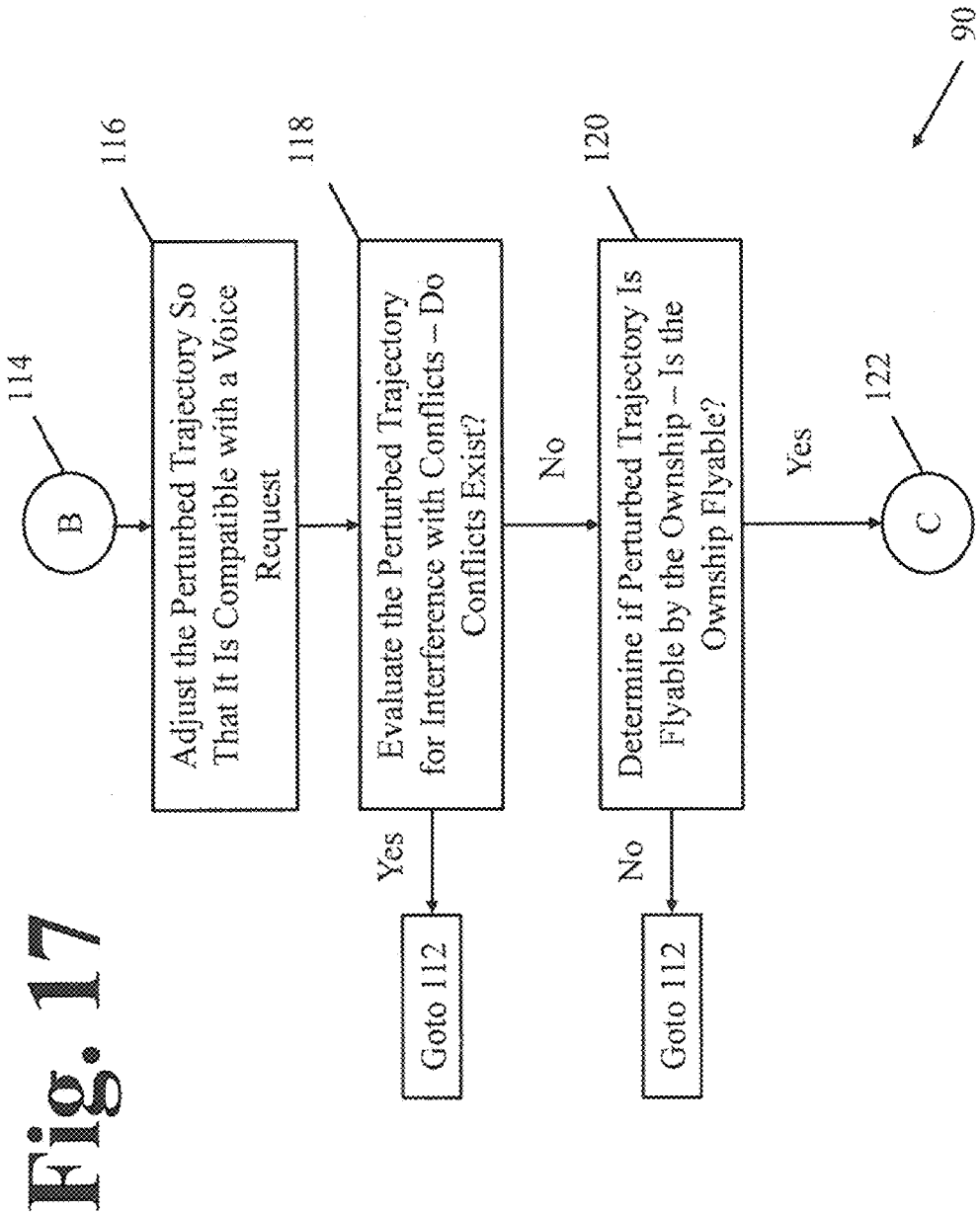

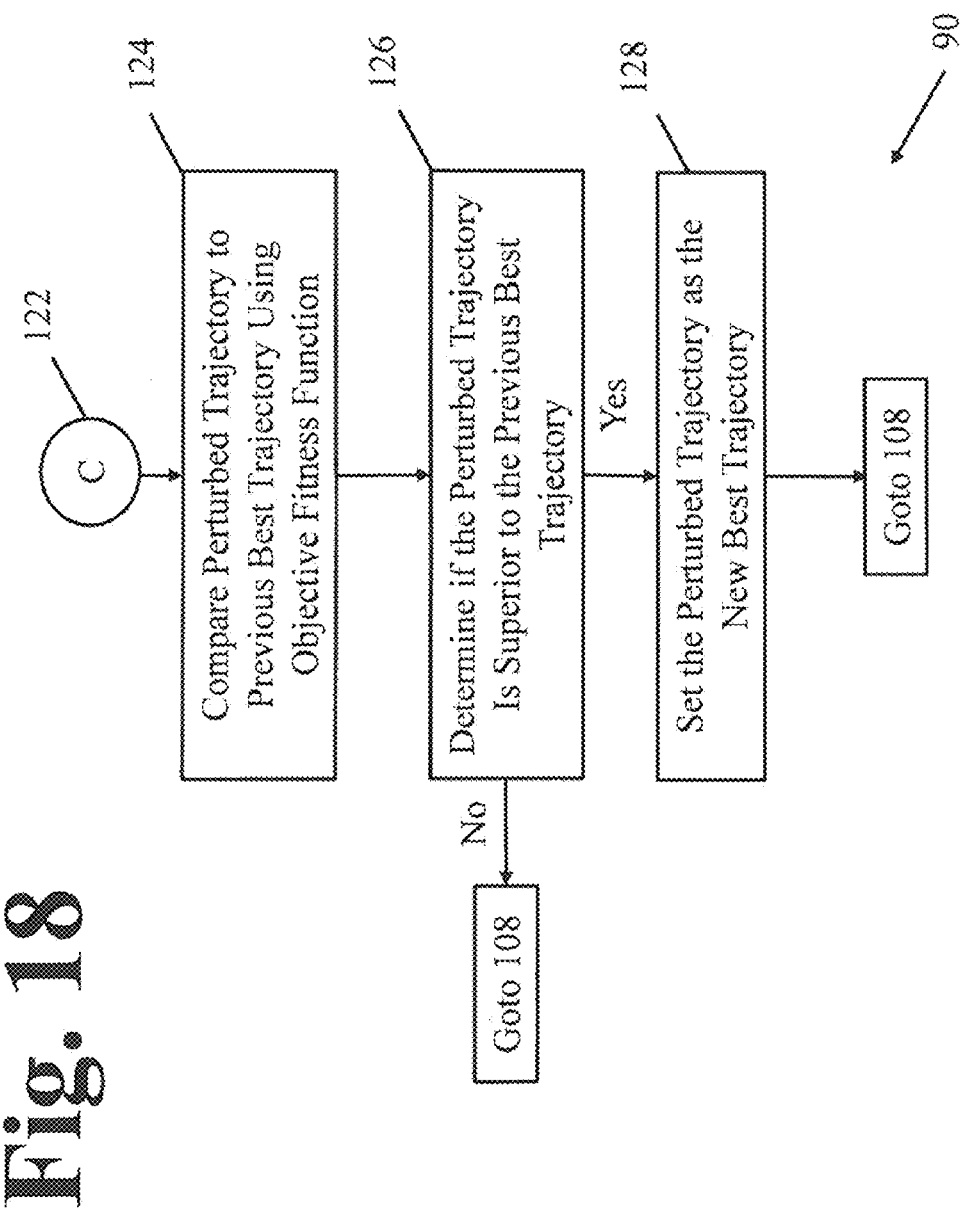

METHOD AND APPARATUS FOR GENERATING FLIGHT-OPTIMIZING TRAJECTORIES

CROSS-REFERENCE TO RELATED PATENT APPLICATION(S)

This patent application claims the benefit of and priority to U.S. Provisional Patent Application Ser. Nos. 61/540,008, filed on Sep. 28, 2011; and 61/683,912, filed on Aug. 16, 2012; the contents of each are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

1. Field of the Invention

The present patent application concerns a method and apparatus that generates flight-optimizing trajectory(ies) for aircraft to facilitate the operation of such aircraft. More specifically, the present invention provides an apparatus and method to improve the likelihood of submitting an approvable trajectory change request.

2. Description of Related Art

As should be apparent to those skilled in the art, requests for trajectory changes are regularly made by pilots to air traffic controllers during flight.

As also should be apparent to those skilled in the art, requests for trajectory changes are more likely to be approved if the requested trajectory does not conflict with trajectories of other traffic aircraft.

In addition, approvable trajectory change requests may benefit the aircraft operator by increasing the portion of the flight flown on or near a desired trajectory, thereby accomplishing various operator objectives for the flight such as maximizing fuel efficiency, minimizing flight time, and/or reducing the impact of turbulence on ride quality.

Approvable trajectory changes also may benefit the air traffic controllers by reducing their workload through reduction of non-approvable trajectory change requests.

While these basic tenets of aviation travel are well understood, under current aviation protocols, requests for trajectory changes are generated only by pilots and flight crews and are considered for approval only by authorized air traffic controller personnel.

To date, a system and method for helping the pilot to identify opportunities for requesting an approvable trajectory change that achieves the aircraft operator's flight optimizing objectives remains unavailable.

BRIEF SUMMARY OF THE INVENTION

The present invention provides a system and method for assessing the approvability of requests for trajectory changes made by pilots during flight.

The present invention has, as one of its features, the ability to increase the likelihood of Air Traffic Control ("ATC") approval of a pilot's trajectory change request through the intelligent use of airborne surveillance information, among other, selected variables.

According to the present invention, a desired trajectory may be determined by the aircraft operator and may be characterized by a combination of route, altitude, and air speed producing, inter alia, a minimum fuel usage, a minimum flight time to the aircraft's destination, or a selected balance between fuel usage and flight time. Other trajectory attributes of interest may include minimum turbulence, minimum delay in establishing a normal routing following a deviation due to weather, or a desired time of arrival.

In one embodiment, the present invention improves the efficiency or other user-desired attributes of the flight, while minimizing the burden on or potentially benefiting the air traffic controller.

The present invention includes, but is not limited to, the use of on-board automation to formulate optimal and conflict-free trajectory change requests. "On-board" refers to the location of the automation on (or within) an aircraft.

The present invention also includes, but is not limited to, automation shared between the aircraft and a non-aircraft-based facility to formulate optimal and conflict-free trajectory change requests. The non-aircraft-based facility may be a ground station.

In one aspect, the present invention contemplates that the automation (1) probes trajectory changes for conflicts with nearby, known traffic, (2) provides pilot awareness of whether proposed trajectory changes may conflict with known traffic, and (3) computes modifications to the current trajectory or to the desired trajectory change that optimize fuel efficiency or other user-specified flight goals within the constraints of traffic, known hazards (e.g., convective weather), and the aircraft flight envelope.

It is contemplated that the automation may operate in either or both of two modes of operation: (1) automated monitoring for opportunities and (2) pilot-initiated use, which is also referred to as a manual mode of operation.

In the mode of automated monitoring for opportunities (automatic mode), the automation periodically probes for trajectory changes that improve flight efficiency or other user-desired attributes and that do not conflict with nearby known traffic. The automation displays identified opportunities to the pilot. If any of these opportunities are desired, the pilot issues the request to the ATC using standard procedures, either by voice or by data link.

In the pilot initiated use mode (manual mode), the pilot enters a desired trajectory change, and the automation probes the entered trajectory change for traffic conflicts. If the automation determines the entered trajectory change would conflict with nearby, known traffic, the pilot is notified, and the pilot may use the automation to identify a modified trajectory change that is free of any known conflicts. Again, if the resulting trajectory change is desired, the pilot issues a request to ATC using standard procedures, either by voice or by data link.

In both modes, the automation may provide an additional function of adjusting the trajectory change request to use named waypoints or other means to facilitate voice communication of the request to ATC.

It is contemplated that the present invention allows for use via currently-existing modes of communication and surveillance.

The present invention also allows for use of modes of communication and surveillance that may exist in the future.

With respect to modes of communication and surveillance that are existing, the present invention contemplates reliance on radio communication. Given that radio (i.e., radio telephony) is contemplated to be relied upon for communication and surveillance for the foreseeable future, the present invention contemplates that radio will continue to be the primary vehicle for modes of communication and surveillance, just as radio telephony is used today.

With respect to modes of communication and surveillance that may be provided in the future, the present invention contemplates reliance on data links and other forms of wireless data transmission and reception that are not considered standard on aircraft existing today. Data transmission, whether by voice or with respect to data transmission (whether analog or digital) may be provided by radio communication modes, as noted above.

In addition, while radio is contemplated for data transmission and reception, other modes may be employed, including optic modes, such as laser light or other suitable alternatives.

It is contemplated that the present invention also will allow for use in airspace, or during time frames, where modes of communication and surveillance are slightly delayed. A slight delay is considered to be as small as a few seconds or as long as a few minutes. Typically, delays are limited to a minute or less, but longer delays are contemplated to fall within the scope of the present invention.

One aspect of the present invention provides for an apparatus for generating at least one flight-optimizing trajectory for a first aircraft. The apparatus includes a receiver that is at least capable of receiving second trajectory information associated with one or more second aircraft. The apparatus also includes a traffic aware planner (TAP) module operably connected to the receiver to receive the second trajectory information. The apparatus also includes at least one internal input device operably connected to the TAP module to provide first trajectory information associated with the first aircraft. The apparatus further includes a TAP application capable of calculating an optimal trajectory for the first aircraft based at least on the first trajectory information and the second trajectory information. The optimal trajectory at least avoids conflicts between the first trajectory information and the second trajectory information.

In one contemplated embodiment, the present invention also includes an aircraft surveillance and communication (ASC) module in communication with the TAP module, where the receiver is incorporated into the ASC module.

It is also contemplated that the present invention provides an apparatus where the ASC module is disposed on the first aircraft.

In one contemplated embodiment of the present invention, the TAP module is disposed on the first aircraft.

In a further contemplated embodiment of the present invention, both the ASC module and the TAP module are disposed on the first aircraft.

In addition, the present invention contemplates that the ASC module is an automatic dependent surveillance broadcast (ADS-B) module.

The present invention also contemplates the inclusion of a transmitter, permitting transmission of first trajectory information associated with the first aircraft. The transmitter may be integral with the ASC module.

In a contemplated embodiment of the present invention, an internal input device is included, which may be selected from an onboard weather radar, a turbulence sensor, an onboard terrain sensor, an onboard database, a pilot input interface, or a flight management system. The term "device" is intended to encompass any hardware and/or software that provides the functionality associated with the listed devices.

Another contemplated embodiment of the present invention includes at least one external input device operably connected to the TAP module. The at least one external input device may be one of a global positioning system (GPS) station, a GPS satellite, a positional data station, a weather station, an airport data station, an aircraft data station (otherwise referred to as a "traffic data station"), or a corporate information module.

It is also possible that the TAP module includes a group comprising a trajectory calculation module, a hazard assessment module, a constraint evaluation module, a trajectory change module, a conflict probe module, a trajectory optimization module, a trajectory change resolution module, a voice request conversion module, a trajectory acceptability module, an opportunity availability module, an ATC request verbiage module, or a data fusion module.

Another embodiment of the present invention provides for a method for generating at least one flight optimizing trajectory for a first aircraft. The method combines a number of steps including: (1) receiving flight data for the first aircraft, (2) receiving at least one four dimensional (4D) trajectory estimate for at least one second aircraft, (3) receiving at least one 4D volume to avoid by the first aircraft, (4) receiving at least one 4D wind prediction, (5) receiving at least one 4D external constraint, (6) calculating a trajectory for the first aircraft using at least one model associated with the first aircraft, and (7) determining if optimization criteria are met.

The present invention also contemplates that the flight data includes flight plan data, flight mode data, guidance mode data, weight, or thrust limits for the first aircraft.

In one contemplated embodiment, the at least one 4D trajectory estimate includes a plurality of 4D trajectory estimates, one for each second aircraft.

In another contemplated embodiment, the 4D volume to avoid includes a plurality of 4D volumes to avoid.

It is also contemplated that the 4D volumes to avoid include at least weather.

With respect to the present invention, the at least one 4D external constraint may include an external constraint from air traffic control, an external constraint imposed by the carrier for the first aircraft, or an external procedural constraint.

In the method of the present invention, at least one model associated with the first aircraft may be an airframe performance model or an engine performance model.

It is contemplated that the optimization criteria includes fuel efficiency of the first aircraft or minimum travel time to destination or a weighted combination of these.

In addition, if optimization criteria are not met, the present invention may include the steps of: (8) perturbing a previous best trajectory for the first aircraft to generate a perturbed trajectory for the first aircraft, (9) adjusting the perturbed trajectory to be compatible with at least one voice request, (10) evaluating the perturbed trajectory to determine if conflicts with the perturbed trajectory exist, and (11) if conflicts with the perturbed trajectory exist, returning to step (8).

If conflicts with the perturbed trajectory do not exist, the present invention contemplates including the additional steps of: (12) determining if the perturbed trajectory is within an operational envelope of the first aircraft, and (13) if the perturbed trajectory is not within the operational envelope of the first aircraft, returning to step (8).

If the perturbed trajectory is within the operational envelope of the first aircraft, the method further includes the steps of: (14) comparing the perturbed trajectory to the previous best trajectory for the first aircraft, (15) determining if the perturbed trajectory is superior to the previous best trajectory, and (16) if the perturbed trajectory is not superior to the previous best trajectory, returning to step (7).

In the method of the present invention, it is contemplated that the comparison of the perturbed trajectory to the previous best trajectory for the first aircraft is performed using a fitness function.

If the perturbed trajectory is superior to the trajectory or the previous best trajectory, the present invention contemplates the additional steps of: (17) setting the perturbed trajectory as the best trajectory, and (18) returning to step (7).

Further aspects of the present invention will become apparent from the discussion that follows.

BRIEF DESCRIPTION OF THE SEVERAL VIEWS OF THE DRAWING(S)

The present invention is described in connection with the drawings appended hereto, in which:

FIG. 17 is a graphical representation of a third part of the method; and

FIG. 18 is a graphical representation of a fourth part of the method.

DETAILED DESCRIPTION OF THE INVENTION

Figure 1:
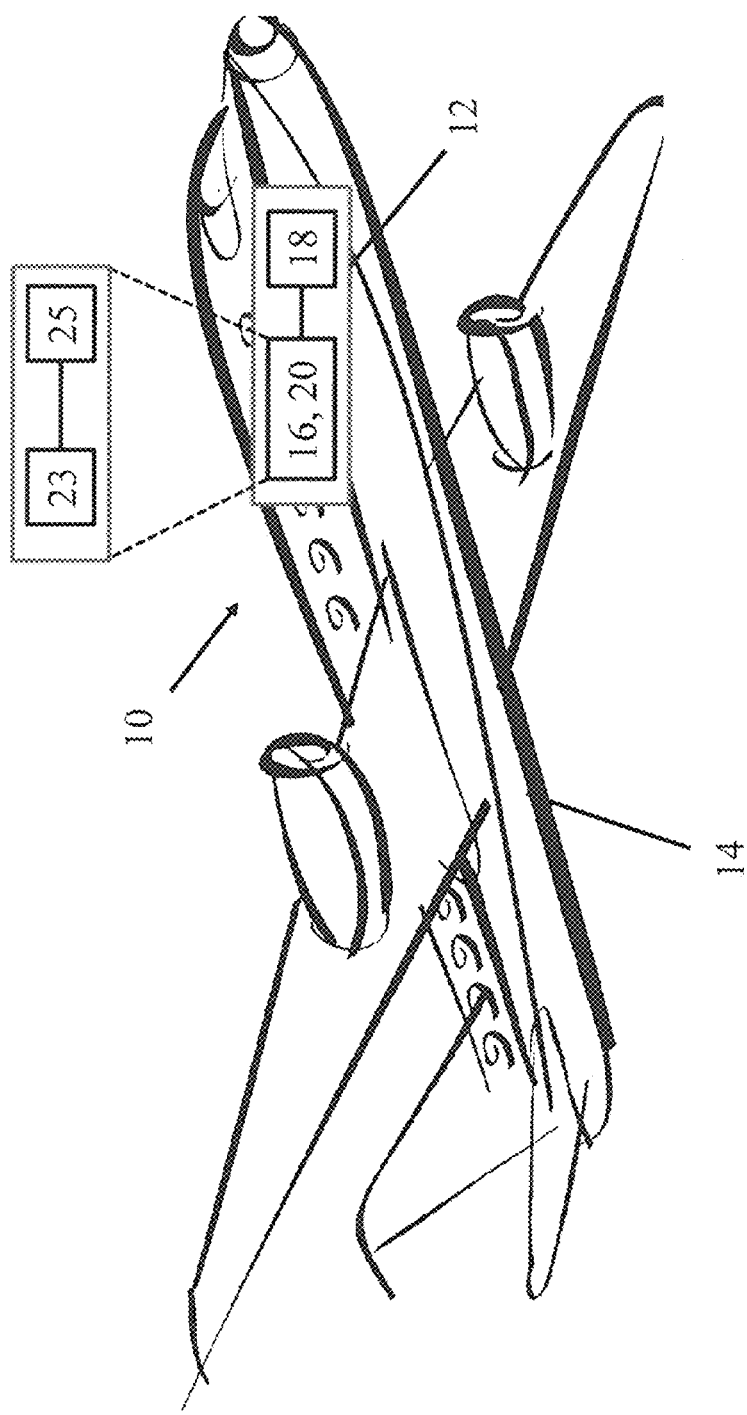
FIG. 1 is a graphical representation of an airplane equipped with the apparatus of the present invention.

In the discussion that follows, the present invention is described in connection with one or more embodiments that are illustrative of the scope of the present invention. While some embodiments of the invention have been herein illustrated, shown and described, it is to be appreciated that various changes, rearrangements and modifications may be made therein, without departing from the scope of the invention as defined by the appended claims. It is intended that the specific embodiments and configurations are disclosed for practicing the invention, and should not be interpreted as limitations on the scope of the invention as defined by the appended claims and it is to be appreciated that various changes, rearrangements and modifications may be made therein, without departing from the scope of the invention as defined by the appended claims.

As should be apparent to those skilled in the art, aircraft operating under Instrument Flight Rules ("IFR") must fly trajectories approved by Air Traffic Control ("ATC"). The approved trajectory flown by an IFR aircraft is generally the trajectory originally specified in a flight plan, as modified by any subsequent ATC clearance received for changes in the flight plan prior to takeoff, and/or as changed or negotiated and approved by the ATC after takeoff, during the flight. In other words, an IFR aircraft trajectory may be altered before and during flight.

As should be apparent to those skilled in the art, the trajectory approved for a particular aircraft often does not coincide with the most efficient or the most preferred trajectory for that aircraft. Flight planning and flight plan selection and filing often result in less desirable trajectories being established prior to departure. Less desirable trajectories result from combinations of variables including non-optimal routes, regulatory altitude and speed restrictions (i.e., those of a general nature, including those imposed by aviation regulations), altitude restrictions issued by ATC before or during the flight, speed restrictions issued by ATC before or during the flight, changing conditions during the flight, and/or changing aircraft operator priorities during the flight.

Some causes of in-flight priority changes include unanticipated weather patterns, convection, or turbulence development. Other causes include the need to make up time as a result of an earlier reroute to avoid traffic or weather, the need to delay arrival at the destination due to traffic congestion or similar delays, and/or the need to increase altitude as fuel is burned to improve operational efficiency. As a result of one or more of these variables, pilots occasionally have a need or desire to change their trajectory while in flight. The desired change may be a revised lateral route, a climb or descent to a different altitude, a change in airspeed, or a combination of these parameters. The desired change may be of a temporary nature, e.g., a heading change to avoid weather, or a long-term nature, e.g., a diversion to an alternate airport or destination.

Because ATC has responsibility to separate IFR aircraft, ATC maintains authority over the trajectories of all IFR aircraft in controlled airspace. IFR pilots are not permitted to make changes to an approved trajectory without first receiving permission for any such change from ATC.

Operationally, the procedure for requesting a trajectory change is well established and commonly used in practice. The pilot prepares the request and, at the appropriate time, communicates the request to the air traffic controller. The controller assesses the request, taking into account nearby traffic and other factors. If the trajectory change does not present a conflict with traffic or other factors, the air traffic controller issues an approval. In other instances, the air traffic controller may issue an amendment to a trajectory, a deferral of the request, or a denial of the request. The pilot then proceeds as instructed.

The present invention seeks to provide, among other features, a system and method that increases the probability of having a trajectory change approved by ATC. To support this feature, the present invention contemplates one or more modes to provide additional information relevant to a determination of an approvable trajectory request. The additional information may include information about the proximity and trajectories of neighboring aircraft, for example, among other types of information that may be available in connection with a particular flight trajectory.

As matters currently stand, flight crews often lack up-to-date information about neighboring aircraft. Without this information, a pilot is unable to consider how a particular trajectory change request will be received by an air traffic controller. Often, trajectory change requests are denied, because the air traffic controller determines that there is a conflict between the trajectory associated with the trajectory change request and the trajectory of another aircraft. In other words, the requested trajectory change may place two aircraft into close proximity, thereby violating protocols for the appropriate distances between aircraft in a given airspace.

As should be apparent, disapproved trajectory change requests are an operational detriment to everyone involved. Disapproved trajectory change requests increase the workloads both for the pilot and the air traffic controller, contribute to radio frequency congestion, and/or prevent pilots from assuming more desirable trajectories for their aircraft.

In addition, when the flight crew does not have available information relevant to the selection of a suitable trajectory, conflict-free opportunities for improving the trajectory are likely to remain undiscovered by pilots. Simply, the lack of onboard traffic information and automation to compute improved trajectory changes interferes with trajectory optimization.

As should be apparent to those skilled in the art, some pilots are able to make a rough assessment of the traffic around them by listening to radio frequency communications and looking at collision-avoidance displays. Moreover, experienced pilots who fly particular routes with regularity may have familiarity with the general traffic patterns in a particular geographic area at particular times of day. Despite this, the accuracy and information content from various "informal" sources are generally insufficient to aid in formulating requests that have a high likelihood of ATC approval. Therefore, pilots are more likely to either make the request irrespective of traffic or to withhold the request altogether.

Other factors also discourage pilots and flight crews from optimizing an aircraft's flight trajectory. For example, flight crews typically do not have access to tools that may assist with evaluating an aircraft's fuel efficiency. As a result, flight crews typically rely on generalizations, rules of thumb, prior experience, or intuition to estimate the fuel efficiency of one flight trajectory versus another. This results in many lost opportunities to identify the most beneficial trajectory change request to optimize aircraft operation.

The present invention is made possible in part due to at least two technology elements that have been in use or have been introduced in recent years. The first is the emergence of aircraft surveillance and communication modules and/or equipment. Aircraft communication and surveillance modules include, but are not limited to, devices such as an Automatic Dependent Surveillance Broadcast ("ADS-B"). The second element is development of onboard automation, specifically processing software, capable of performing accurate trajectory probing, aircraft performance, and/or cost-based optimization computations to aid in the identification and formulation of optimal conflict-free trajectory requests.

ADS-B receivers provide aircraft with access to specific, helpful information that may be used to help formulate trajectory change requests that avoid other aircraft and therefore are more likely approvable by ATC. In particular, ADS-B receivers receive timely and accurate traffic surveillance information with respect to other aircraft in the immediate vicinity. ADS-B receivers acquire this surveillance data from one of two potential sources, among others (including, for example, satellites and the Internet): (1) nearby aircraft equipped with ADS-B transmitters and (2) ground-based systems such as a Traffic Information Service Broadcast (or TIS-B). The combination of information from these two sources provides a portrait of the traffic situation proximate to an aircraft.

The portrait of the traffic situation proximate to an aircraft depends upon the completeness of the available information. It is contemplated that the present invention will operate with a partial portrait of the traffic situation proximate to the aircraft. It is contemplated in the future that all aircraft may be provided with suitable functionality to generate a nearly complete (or even a complete) portrait of the traffic situation proximate to the aircraft.

Processing software, which is the second element noted above, is capable of performing trajectory optimization computations to aid in the identification and formulation of optimal conflict-free trajectory requests. The software automation computes new trajectories based on optimization criteria provided by the pilot. The processing software also uses information from uplinked weather services and on-board weather radar to identify potential weather hazards to be avoided.

When combined together, the aircraft surveillance and communication module and the processing software generate information that may be of great assistance to a pilot and the aircraft's flight crew. As a general rule, the pilot is considered to be a part of the flight crew. Therefore, reference herein to the "crew" includes the pilot. Where reference is made to the pilot only, it should be understood that the term "pilot" is not intended to be limiting of the present invention but may also refer to any member of the flight crew.

With respect to a first embodiment, FIG. 1 illustrates the one general approach contemplated by the present invention. Specifically, FIG. 1 illustrates an individual TASAR installation 10, when TASAR is embodied on the flight deck of an aircraft 14. TASAR is the acronym used in connection with the present invention, otherwise known as "Traffic Aware Strategic Aircrew Requests."

In one contemplated embodiment, the TASAR installation 10 combines a TASAR module 12 with an aircraft 14. In a second contemplated embodiment, the TASAR installation 10 may include components both on the aircraft 14 and situated at a non-aircraft location, such as a ground-based station.

In a third contemplated embodiment, the TASAR installation 10 may be positioned at a non-aircraft location, such as a ground-based station. In this embodiment, the aircraft 14 may interface with the ground-based installation.

In a variation of these embodiments, it is contemplated that the TASAR installation 10 may be shared with a satellite or other airborne (or space-based) components without departing from the scope of the present invention. In other words, the TASAR installation 10 may benefit from a distributed architecture, where components at disparate locations cooperate together.

In connection with the present invention, TASAR also may be referred to by those skilled in the art as "Traffic Aware Strategic User Requests" ("TASUR"). Both monikers are intended to refer to the present invention and, for purposes of the instant discussion, are considered equivalents or variations of one another, as should be apparent to those skilled in the art.

As shown in this illustrated embodiment, the TASAR module 12 combines a receiver 16 that connects to and is in communication with a trajectory software module 18, also referred to herein as a TAP ("Traffic Aware Planner") module 18.

As discussed herein, the receiver 16 may be a part of an aircraft surveillance and communication module 20 (referred to herein as an "ASC module" 20). An aircraft surveillance and communication module 20 combines a surveillance module 23 together with a communications module 25. The communications module 25 includes at least the receiver 16. The communications module 25 also may include a transmitter (not shown). The surveillance module 25 provides surveillance functionality with respect to surveying other aircraft proximate to the aircraft 14.

An ADS-B transmitter/receiver represents one contemplated embodiment of the aircraft surveillance and communication module 20. An ADS-B transmitter/receiver, therefore, should not be considered to be limiting of the scope of the present invention.

For simplicity of the discussion that follows, the aircraft surveillance and communication module 20 is referred to as the ASC module 20. The hardware and/or software module 18 is referred to as the TAP module 18.

With respect to the embodiment illustrated in FIG. 1, the term TASAR module 12 is considered to be quite broad. Within the context of the present invention, the TASAR module 12 encompasses components and/or software that facilitate the formation of optimal and conflict-free trajectory requests, the details of which are provided below.

With respect to the TAP module 18, it is noted that this module is contemplated to be a combination of hardware and software that receives input and calculates trajectories for the aircraft 14. Because the TAP module 18 is contemplated to be a combination of hardware and software that executes code (i.e., instructions and algorithms) on a suitable processor, the TAP module 18 combines both hardware and software so that it may perform the requisite calculations. In other words, the TAP module 18 may be coded into a semiconductor component (i.e., a PROM or EPROM (including one or both of volatile and/or non-volatile memory)) without departing from the scope of the present invention.

It is noted that, because the TAP module 18 is considered to combine both hardware and software, the TAP module 18 may be a portable device that may be brought on board the aircraft 14 by a member of the flight crew. Portability, however, is not required to practice the present invention. Moreover, portability may not be possible due to constraints for aircraft certification that are imposed by the Federal Aviation Administration ("FAA") or equivalent regulatory agencies worldwide.

In the embodiment illustrated in FIG. 1, the ASC module 20 should be understood to include a receiver 16 and a transmitter, both of which cooperate to facilitate communication and surveillance. This permits the ASC module 20 to send and receive data and pertinent information.

As indicated above, the communication and surveillance function of ASC module does not need to include both a transmitter and a receiver 16. For example, it is contemplated that the aircraft 14 may incorporate an ASC module 20 that includes only a receiver 16 and not a transmitter. In this alternative configuration, the aircraft 14 is contemplated to transmit data and information via an integral transmitter or via one or more devices that are available for communication on the aircraft 14. For example, the aircraft 14 may receive and transmit information via a receiver/transmitter (i.e., a communications radio) that is not a component of the surveillance and communication function of ASC module 16.

Figure 2:
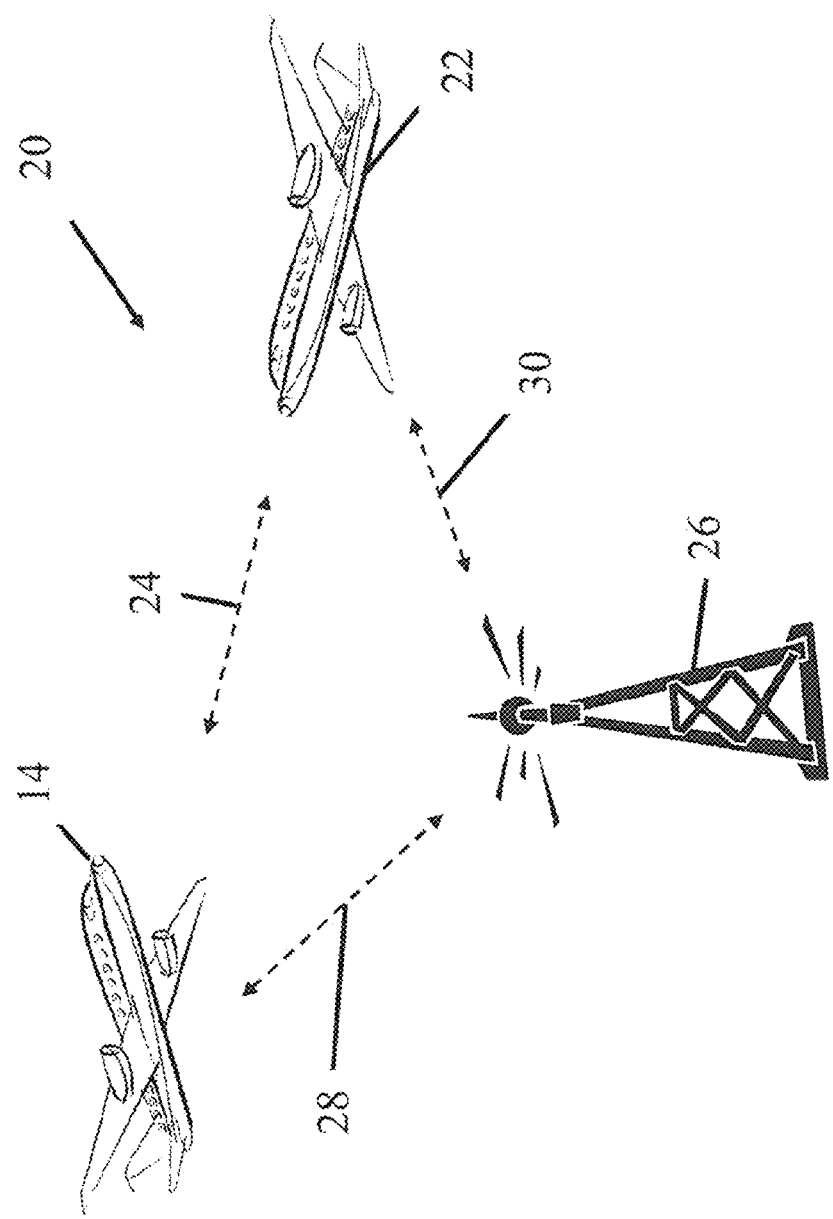
FIG. 2 is a graphical representation of a system involving two aircraft equipped with the apparatus of the present invention.

One embodiment of the TASAR system 20 of the present invention is illustrated in FIG. 2. In this illustration, two aircraft 14, 22 are shown in graphic format in positional relation to one another. The aircraft 14 is equipped with a TASAR module 12. The aircraft 22 may or may not be equipped with a TASAR module 12. The aircraft 14, 22 are capable of transmitting and receiving trajectory information with one another via one or more wireless, aircraft-to-aircraft, communication channels 24. The aircraft-to-aircraft communication channel 24 may be a dedicated channel or may be a channel shared with other communications, as should be apparent to those skilled in the art.

As a point of clarification, it is noted that the aircraft 14, 22 are not contemplated to coordinate operation with respect to one another. Each of the aircraft 14, 22 operates independently from the other. While one aircraft 14 receives data about the other aircraft 22 via the communication channel 24, the other aircraft 22 need not receive information about the first aircraft 14 in order for aircraft 14 to practice TASAR. In other words, there is no requirement for practicing the present invention on both aircraft 14, 22 simultaneously.

With respect to FIG. 2, it is noted that the TASAR system 20 of the present invention is contemplated to operate with multiple aircraft 14, 22 simultaneously. In other words, the present invention is not intended to be limited solely to two aircraft 14, 22. As noted above, the aircraft 14, 22 are not intended to cooperate with one another. However, it is contemplated in a future embodiment that the aircraft might cooperate with one another. This future embodiment also is contemplated to fall within the scope of the present invention.

In the illustration provided in FIG. 2, a ground tower 26 is shown. In one embodiment, the ground tower 26 may be a TIS-B transmitter that provides traffic surveillance information regarding several aircraft, including the aircraft 14, 22. The ground tower 26 communicates with the aircraft 14, 22 via wireless, ground-to-air communication channels 28, 30.

With respect to the wireless communication channels 24, 28, 30, it is contemplated that the communications will be via suitable, two-way radio communications. The mode of the communications may be analog, digital, or any suitable variant. While radio waves are contemplated for the present invention, any other electromagnetic radiation modes may be employed without departing from the scope of the present invention. For example, light with a wavelength greater (or less than) that of radio waves may be employed without departing from the scope of the present invention.

Figure 3:
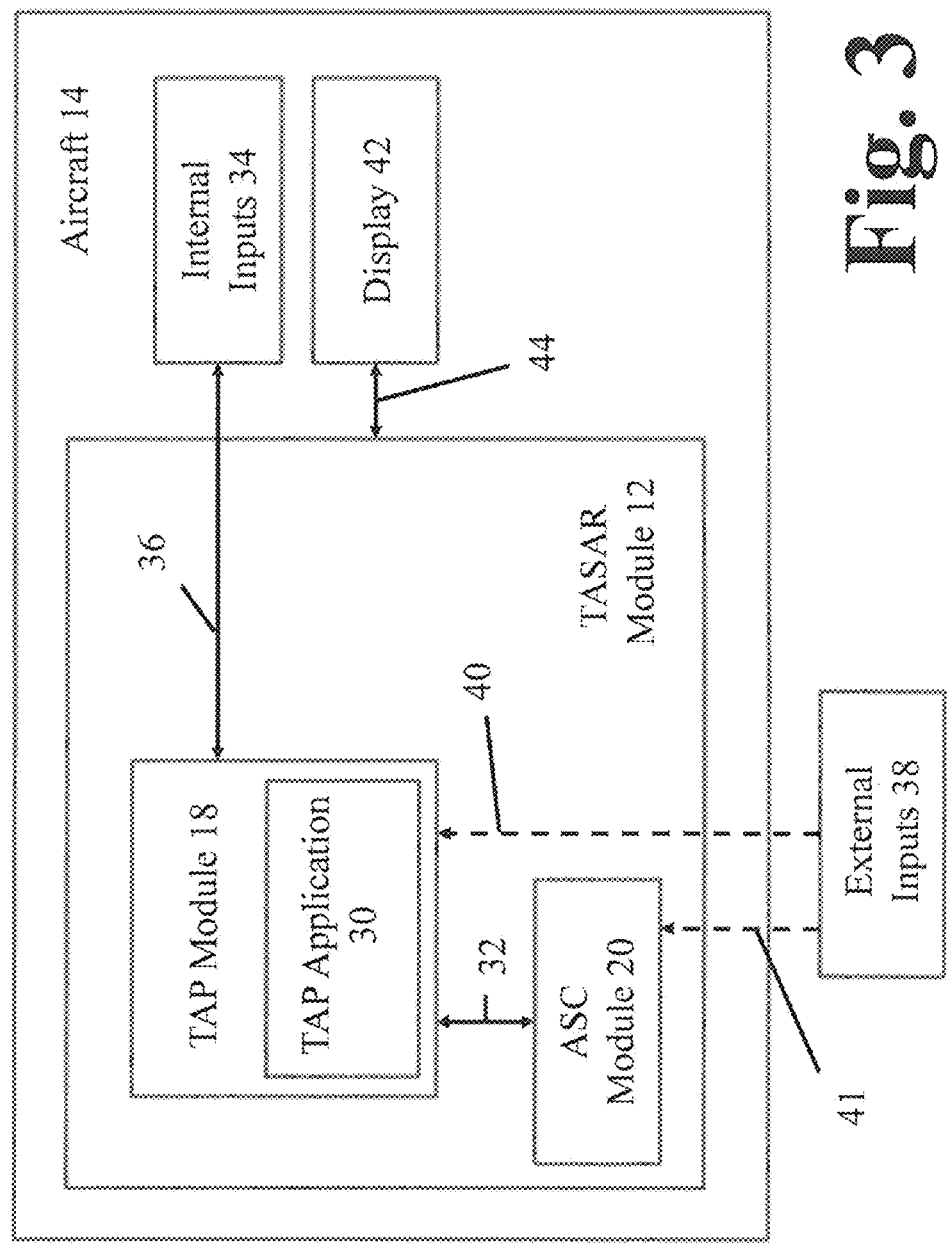
FIG. 3 is a graphical overview of a first contemplated embodiment illustrating the connections between various components of the apparatus of the present invention.

FIG. 3 is a graphical illustration of one contemplated embodiment of the TASAR installation 10 consistent with the overview that is generally designated in FIG. 1. In this embodiment, the TASAR module 12 is located on the aircraft 14. The TASAR module 12 includes the TAP module 18, which houses the TAP application 30.

As should be apparent from FIG. 3, the ASC module 20 also is considered to be a part of the TASAR module 12. Here, the ASC module 20 is connected to and communicates with the TAP module 18 via a communication channel 32. The TAP module 18 also may receive data and information from other, internal inputs 34 via a communication channel 36. Finally, the TAP module 18 may receive data and information from other, external inputs 38 via one or more communication channels 40, 41.

So that the pilot may have access to the information generated by the TAP module 18, a display 42 is connected to the TASAR module 12 (or, alternatively, directly to the TAP module 18) via a communication channel 44. The display 42 may be a suitable optical display, such as a monitor. Alternatively, the display 42 may be auditory only, such as vocal information (i.e., provided by a speech synthesizer within the TASAR module 12) so that the information from the TASAR module 12 is conveyed to the flight crew via speakers, headsets, or the like.

It is also contemplated that the display 42 is a two-way display 42. In this configuration, the display 42 not only provides visual information but also functions as an input device. Specifically, the display 42 incorporates a touch-sensitive surface so that the pilot (or flight crew member) may input data via the display 42 in addition to receiving visual information via the display 42.

Figure 9:
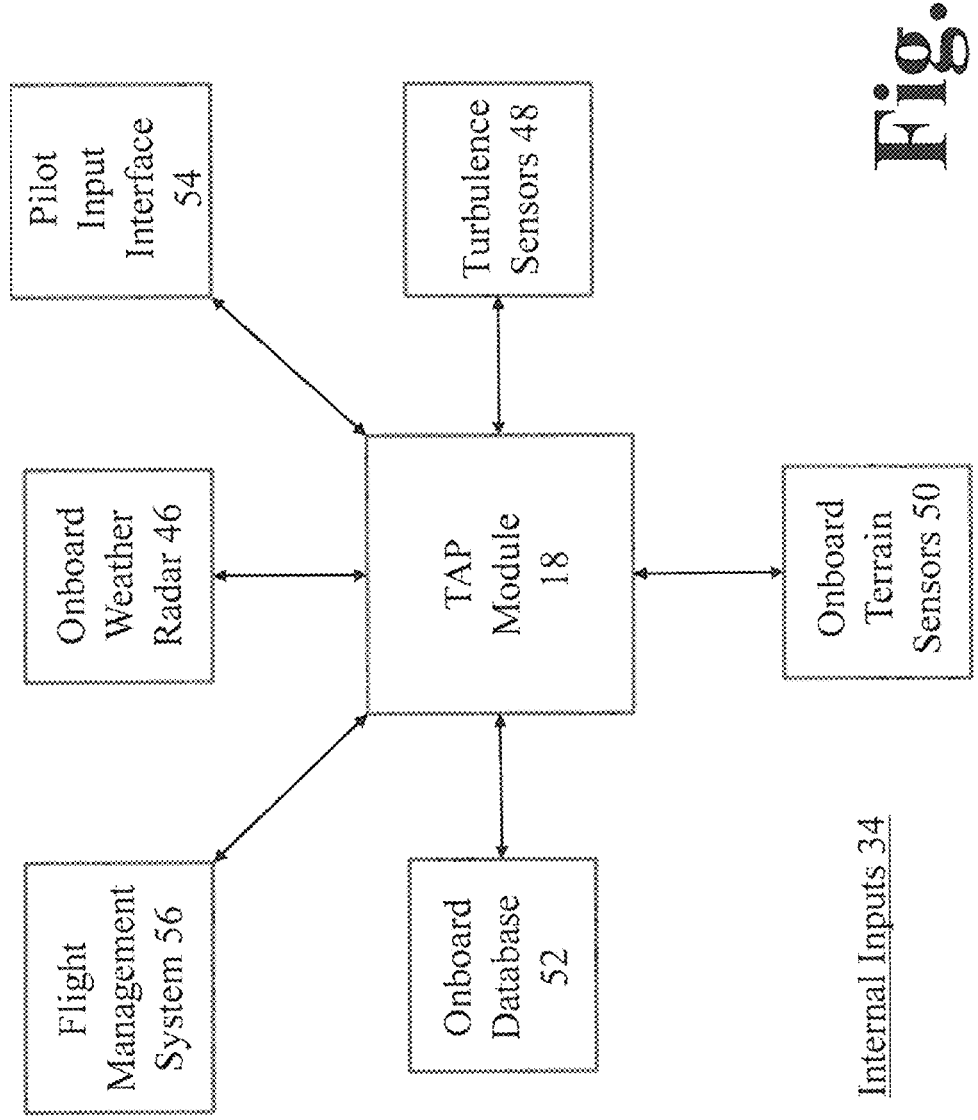
FIG. 9 is a graphical overview of various components, internal to the aircraft, that are contemplated to communicate with the apparatus of the present invention.

With further reference to the display 42, it is noted that the pilot may have access to a separate input device (i.e., the pilot input interface 54 shown in FIG. 9) for providing flight information and flight parameters to an onboard computer, such as a Flight Management System 56 (also referred to as a "FMS" 56 and shown in FIG. 9.) As should be apparent, therefore, the display 42 may be a convenient vehicle for consolidation of all pilot input. Alternatively, the display 42 may simply provide a separate and independent platform for the pilot input interface 54.

With continued reference to FIG. 3, it is noted that each of the communication channels 32, 36, 44 are contemplated to be two-way communication channels. As should be apparent to those skilled in the art, two-way communication channels may not be required. As such, a one-way communication channel may be employed without departing from the scope of the present invention. Alternatively, multiple one-way communication channels may be employed without departing from the scope of the present invention. Still further, the individual devices may communicate with each other via a suitable data bus or a suitable alternative. In other words, the exact connections between the devices and the TAP module 18 are not critical to the operation of the present invention.

As also depicted in FIGS. 3-8, the external inputs 38 may provide information via a wireless communication channel 41. The information from the external inputs 38, therefore, may travel via one or both of the communication channels 40, 41 for input to the TAP module 18. The external inputs 38 may include information from the ground tower 26 and provide data from a TIS-B, among other data inputs, for example.

It is noted that the communication channels 32, 36, 44 are contemplated to be wired connections, since the ASC module 20, the internal inputs 34, and the display 42 are all internal to the aircraft 14. The communication channels 40, 41 are considered to be wireless communication channels, since the external inputs 38 are external to the aircraft 14. As should be apparent to those skilled in the art, any one of the communication channels 32, 36, 44 also may be wireless without departing from the scope of the present invention.

As noted above, it is contemplated for one embodiment of the present invention that the information from the TAP module 18 will not require a display 42 to provide traffic information to the flight crew. Such a display 42 is referred to in the art as a cockpit display of traffic information or "CDTI." This embodiment is considered to be beneficial for at least one reason. Specifically, if a CDTI is omitted from the operation of the present invention, the present invention may be provided on an aircraft 14 without the need for certification and associated cost issues that are common with displaying traffic information in the cockpit. In this embodiment, rather than the pilot interpreting a traffic display, the surveillance data may be provided to other automation equipment available on the aircraft 14, which in turn supports the pilot in formulating conflict-free requests. Thus, at least with respect to this embodiment, the present invention supports early and low-cost adoption on platforms not normally approved for traffic display, such as Class 2 Electronic Flight Bags ("EFBs").

Figure 4:
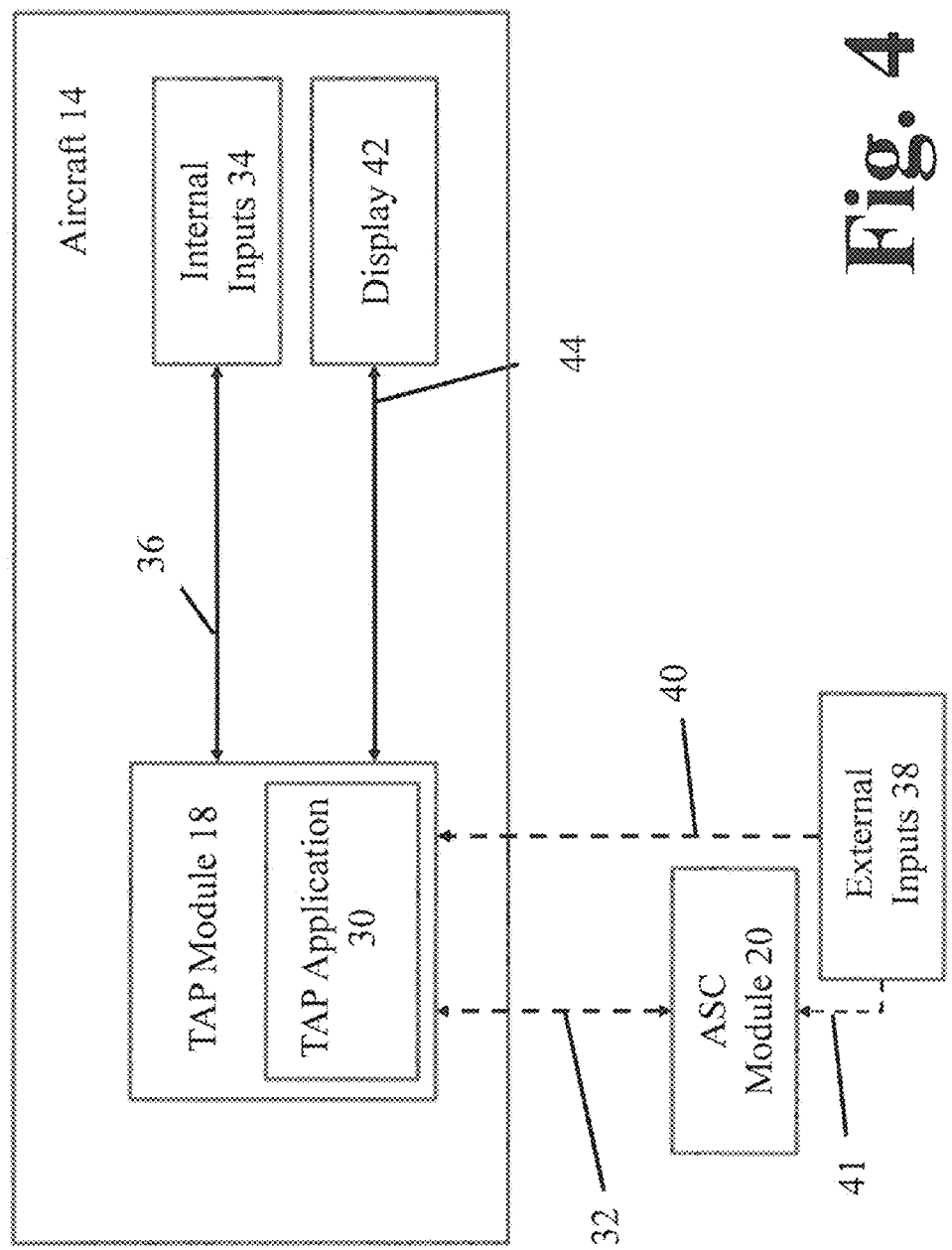
FIG. 4 is a graphical overview of a second contemplated embodiment illustrating the connections between various components of the apparatus of the present invention.

In a further contemplated embodiment, which is illustrated in FIG. 4, the ASC module 20 is external to the aircraft 14. In this embodiment, the TAP module 18 is located on the aircraft 14. The ASC module 20 is located at a ground-based station. As should be apparent, therefore, the TASAR module 12 is not disposed, as a single unit, on board the aircraft 14. Instead, the TASAR module 12 benefits from a distributed architecture, as illustrated. In this embodiment, the communication channels 32, 40, 41 are wireless, as should be apparent.

Figure 5:
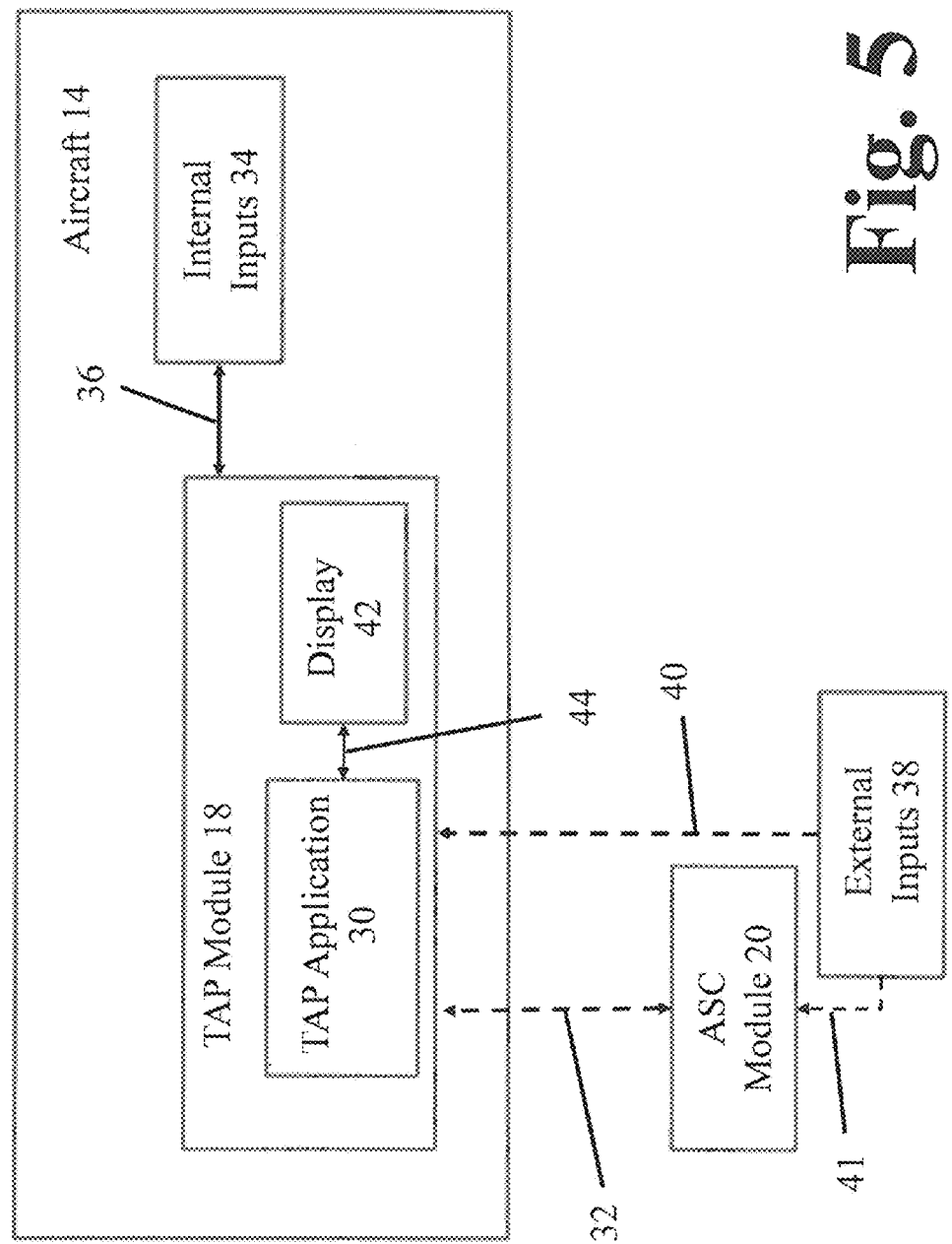
FIG. 5 is a graphical overview of a third contemplated embodiment illustrating the connections between various components of the apparatus of the present invention.

In still a further contemplated embodiment, the display 42 may be incorporated into the TAP module 18. This embodiment is illustrated in FIG. 5.

Figure 6:
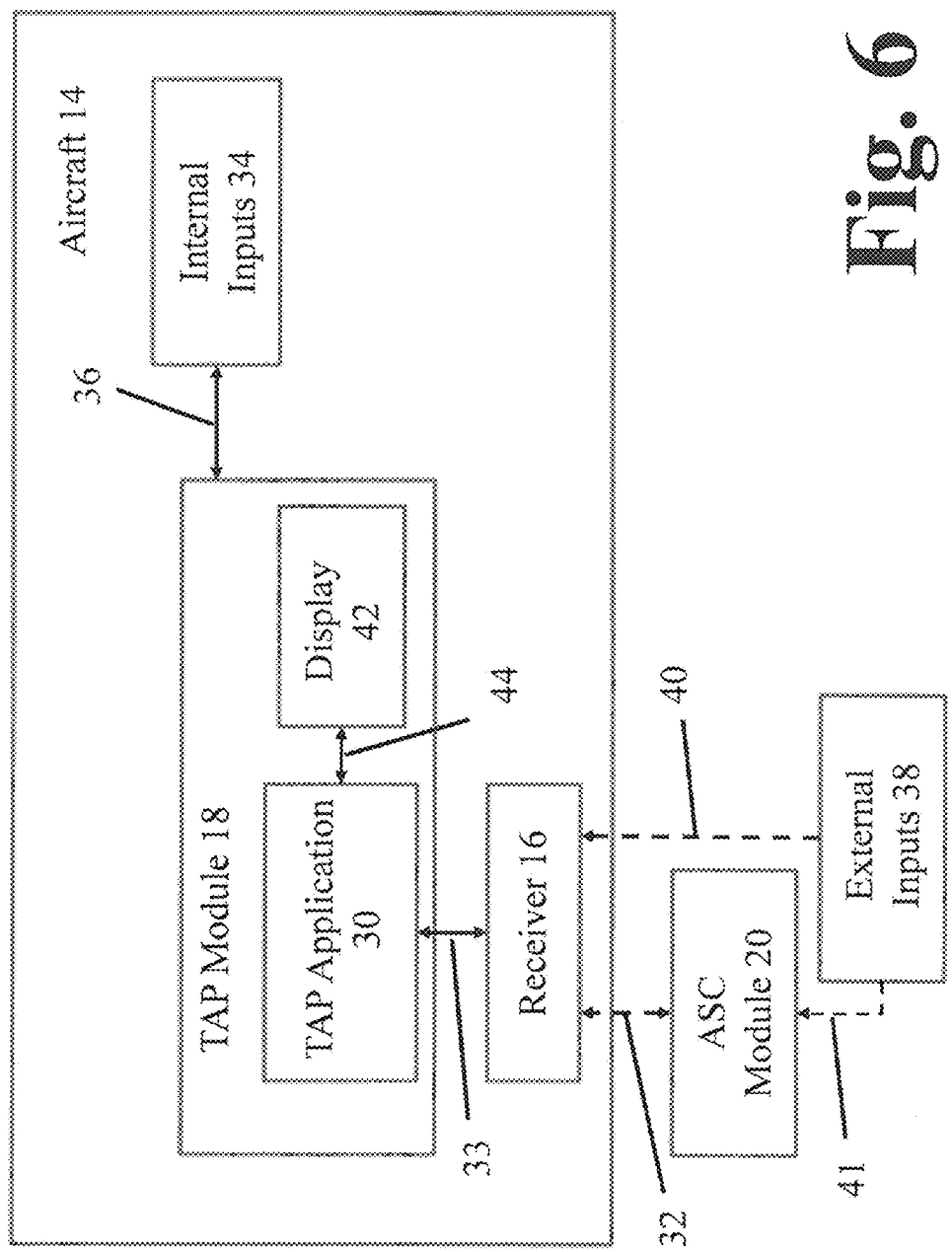
FIG. 6 is a graphical overview of a fourth contemplated embodiment, illustrating the connections between various components of the apparatus of the present invention.

FIG. 6 illustrates a further contemplated embodiment of the present invention. In FIG. 6, a receiver 16 is illustrated on the aircraft 14. In this embodiment, the ASC module 20 transmits information to the aircraft 14. The data is received by the receiver 16 and then provided to the TAP module 18 via the communication line 33. In this embodiment, the display 42 also is a part of the TAP module 18.

Figure 7:
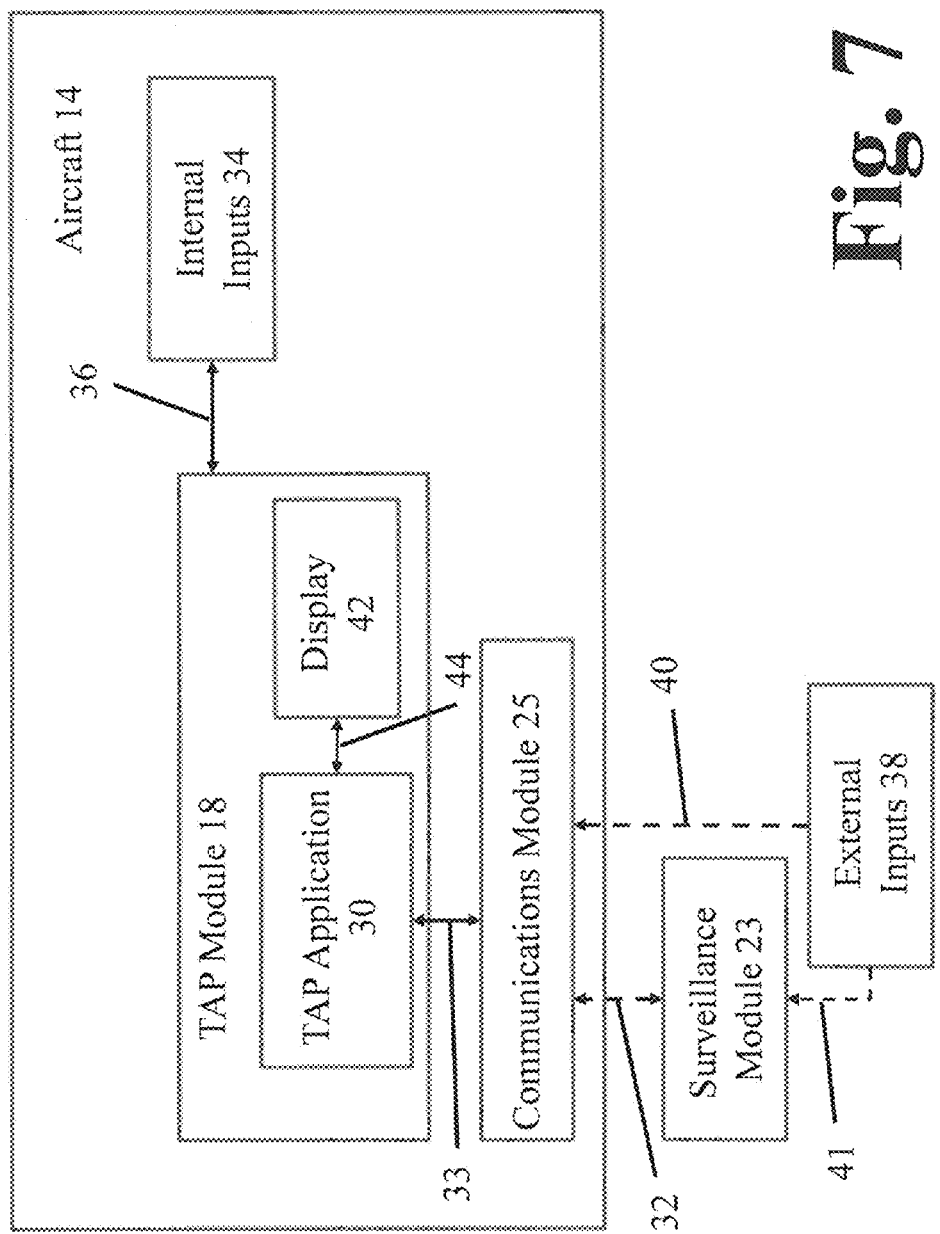
FIG. 7 is a graphical overview of a fifth contemplated embodiment, illustrating the connections between various components of the apparatus of the present invention.

FIG. 7 illustrates yet another contemplated embodiment of the present invention. Here, the ASC module 20 has been divided into two components, the surveillance module 23 and the communications module 25. Unlike the embodiment illustrated in FIG. 1, the communications module 25 is onboard the aircraft 14 while the surveillance module 25 is not.

As should be apparent from the embodiments that are illustrated in FIGS. 3-8, and as should be apparent from the discussion provided herein, the present invention may be embodied in any of a number of different arrangements of components. The different variations, in addition to those that become apparent to those skilled in the art based on the specific embodiments illustrated and described, also as intended to be encompassed by the present invention. In other words, as noted above, the embodiments described herein are intended to be exemplary of the scope of the present invention and not limiting of the present invention.

Figure 8:
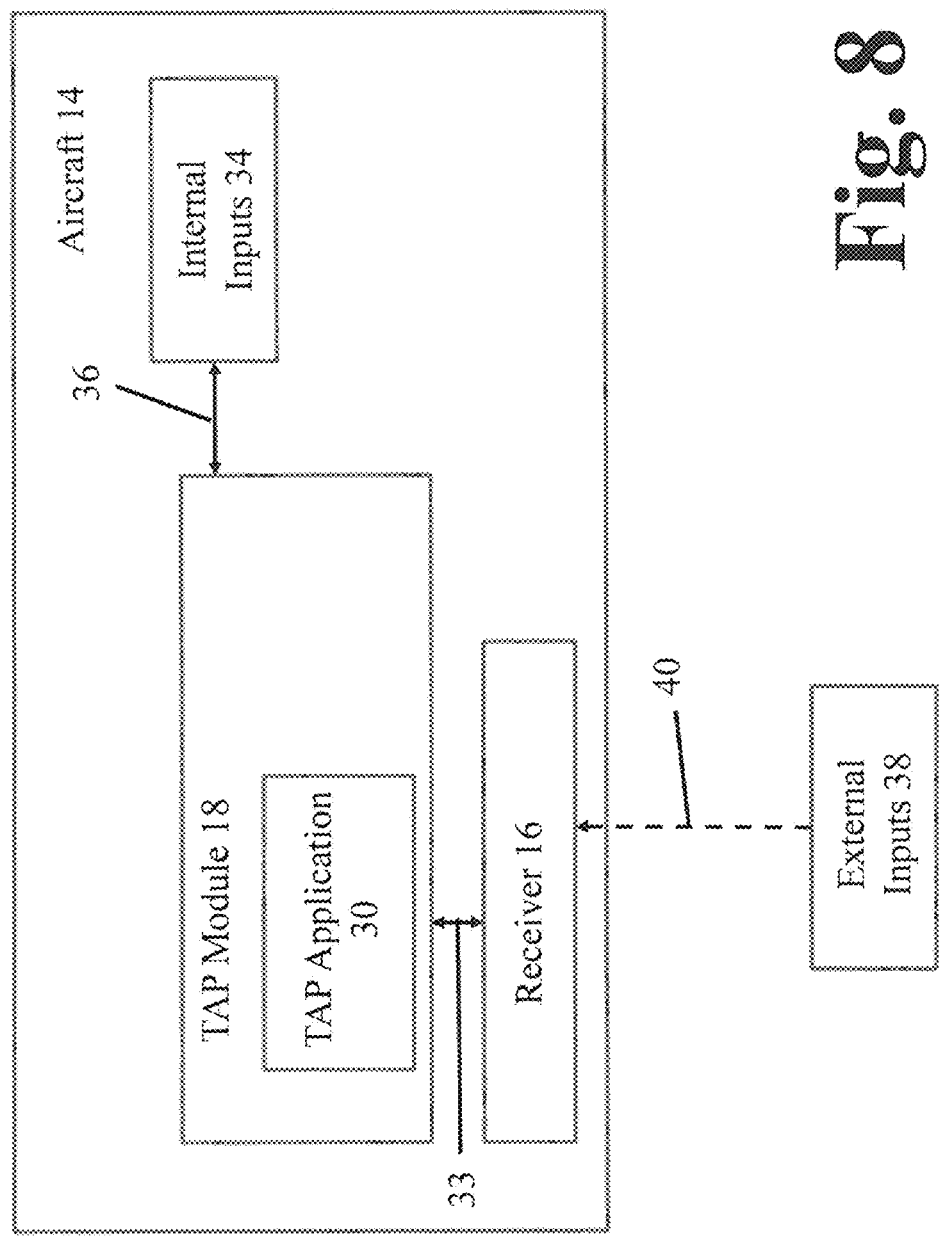
FIG. 8 is a graphical overview of a sixth contemplated embodiment, illustrating the connections between various components of the apparatus of the present invention.

With respect to FIG. 8, it is noted that the most basic arrangement of components for a TASAR installation 10 includes the TAP module 18, the receiver 16, and the internal inputs 34. The TAP module 18 houses the TAP application 30. The receiver 16 receives information surveillance relevant to a proximate aircraft 22 (such as data from external inputs 38). The receiver 16 then provides that information to the TAP module 18. Separately, the internal inputs 34 provide information regarding the flight path of the aircraft 14. The TAP application 30 then processes the information about the proximate aircraft 22 and the aircraft 14 to suggest a trajectory that may be acceptable to ATC.

Other arrangements of components are contemplated, as discussed in connection with FIGS. 3-8. Moreover, any one component from FIGS. 3-8 may be added to the basic construction provided by FIG. 8, thereby defining further variations thereof.

As already discussed, one purpose of the present invention is to advise the pilot of possible trajectory changes that might be beneficial to the flight and also that may be likely to increase the probability of ATC approval of pilot-initiated trajectory change requests, thereby increasing the portion of the flight flown on or near a desired trajectory (e.g., fuel efficiency, minimum flight time, low turbulence, etc.). For purposes of the discussion that follows, the aircraft 14 on which a particular pilot and/or flight crew is stationed is referred to as "the ownship" to distinguish that aircraft 14 from other aircraft (i.e., traffic aircraft 22) in the vicinity of the ownship 14.

As noted above, traffic surveillance information with respect to nearby aircraft 22 is received by the TAP module 18 on the ownship 14. The TAP module 18 includes an onboard software application (the "Traffic Aware Planner" or "TAP" application 30), which processes the surveillance information and performs conflict probing of possible changes to the trajectory for the ownship 14. In addition to surveillance information, the TAP application 30 also may process other data including hazard data.

FIG. 9 illustrates one contemplated embodiment of the different devices that may be connected to the TAP module 18 to provide pertinent information thereto, as input for the TAP application 30. For example, the TAP application 30 may receive input from one or more of the following devices that are available on the ownship 14: (1) onboard weather radar 46, (2) turbulence sensors 48, (3) terrain sensors 50, or (4) an onboard database 52, which may include information relevant to the performance characteristics of the ownship 14 as well as any pilot preferences (among other information). A pilot input interface 54 also may be provided. These devices 46, 48, 50, 52, 54 are all considered as included in the internal inputs 34 that are provided onboard the ownship 14.

The onboard database 52 may provide any number of different, relevant data. For example, the database 52 may provide data concerning the airspace, among other variables.

Separately, the Flight Management System 56 may provide information concerning, for example, route data for the ownship 14, waypoint data, and aircraft situational data, to list a few examples. Aircraft situational data includes, but is not limited to, current weight of the ownship 14, guidance state of the ownship 14, and flight mode of the ownship 14.

The onboard weather radar 46 detects weather conditions proximate to the ownship 14 and generates weather data that may be used by the TAP application 30. Turbulence sensors 48 detect the turbulence conditions experienced by the ownship 14 and generate turbulence data that is useable by the TAP application 30 when calculating the optimal trajectory for the ownship 14. It is noted that turbulence information also may be provided from one or more external inputs 38 (e.g., a weather station 62), as discussed below. The terrain sensors 50 detect any pertinent ground features, such as mountains and buildings, and generate terrain data useable by the TAP application 30.

The onboard database 52 stores data that may be taken into account by the TAP application 30. The onboard database 52 may provide, for example, buffer data to indicate the appropriate distancing between aircraft 14, 22 in a particular airspace. The onboard database 52 also may include data such as sector boundary data.

The pilot input interface 54 is contemplated to encompass one or more interfaces available to the pilot, co-pilot, and flight crew through which crew-inputted data is made available to the TAP application 30. As discussed above, the pilot input interface 54 may include the input functionality of the display 42. Also, the pilot input interface 54 is intended to encompass any of a number of input devices that are available to the pilot. The pilot input interface 54, therefore, is not considered as being limited to any one particular input device.

While not illustrated in FIG. 9, it is contemplated that further internal inputs 34 may be connected to the TAP module 18. For example, the TAP module 18 may receive and make use of information from a plurality of onboard sensors and computed information. Sensor and, computed information available through standard aircraft communications architectures includes, but is not limited to, air speed, ground speed, ambient conditions around the ownship 14, engine parameters, fuel on board, and aircraft systems health, etc. In this regard, there are a number of attributes about the current condition and operation of the ownship 14 that may be relevant to calculations performed by the TAP application 30. As such, the depiction of specific internal inputs 34 in FIG. 6 should not be considered as limiting of the present invention.

Figure 10:
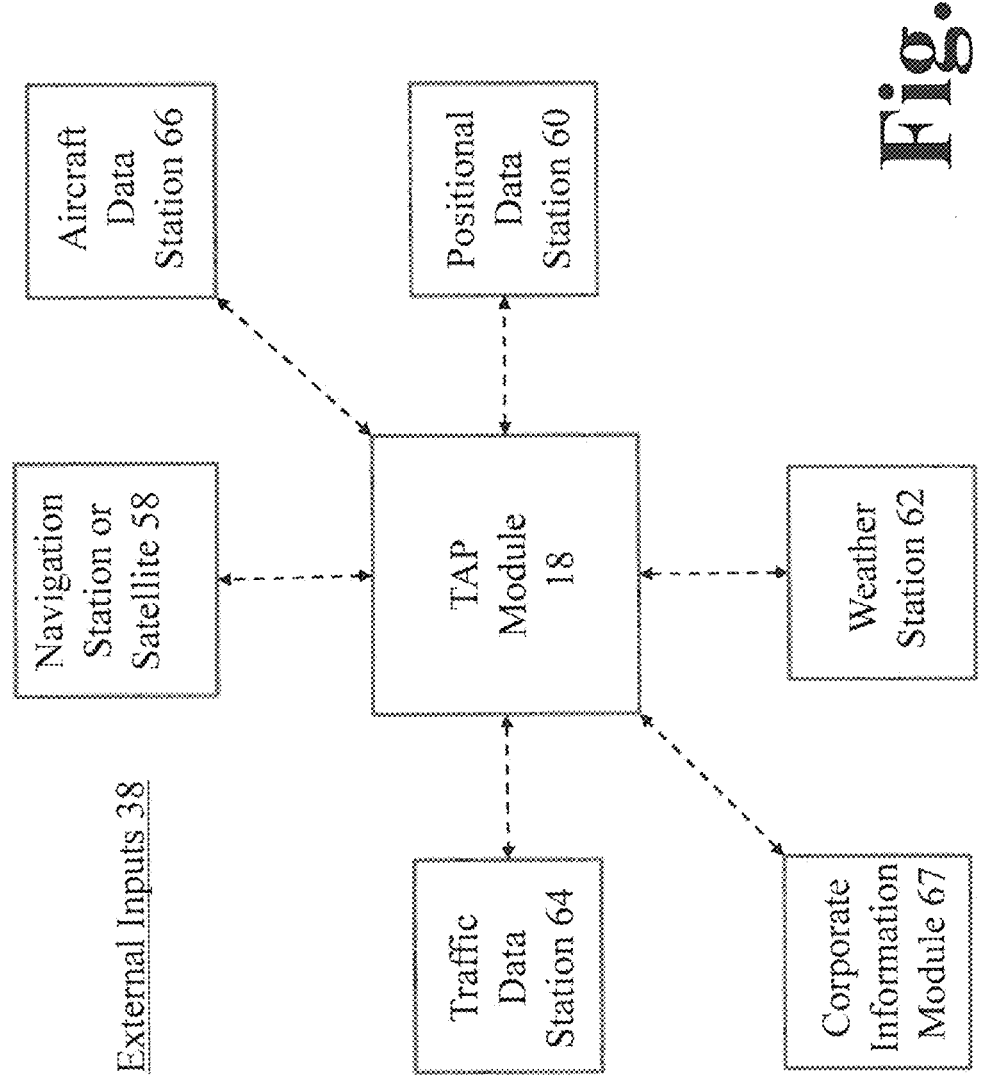
FIG. 10 is a graphical overview of various components, external to the aircraft, that are contemplated to communicate with the apparatus of the present invention.

With respect to the external inputs 38 depicted in FIG. 10, it is noted that a TIS-B may provide relevant traffic information to the ownship 14 via the ground tower 26. Other information also may be provided from external sources via the ground tower 26 or other transmitter. For example, the external inputs 38 may include navigation (i.e., GPS) data via a navigation station or satellite 58, other relevant positional data via a positional data station 60, data concerning weather conditions via a weather station 62, information concerning constraints associated with the destination airport via an traffic data station 64 (which provides information regarding the status of the destination airport), and information about the flight conditions via an aircraft data station 66, for example. The navigation station or satellite 58 provides at least current positional information about the location of the ownship 14 and/or traffic aircraft 22. The positional data station 60 provides positional and/or trajectory data regarding the location, direction, speed, and/or trajectory of the ownship 14 and/or traffic aircraft 22. The weather station 62 provides at least current positional and/or trajectory information regarding convective weather, winds aloft, and turbulence proximate to the ownship 14 and/or traffic aircraft 22. The traffic data station 64 provides data regarding the ground conditions at the destination airport (or other airports proximate at least to the ownship 14). The aircraft data station 66 provides information about the flight conditions of the ownship 14 and/or traffic aircraft 22 proximate to the ownship 14 that may be relevant for the calculations performed by the TAP application 30. While traffic, location, trajectory, and weather information are considered as the primary sources of the external inputs 38, the present invention should not be considered to be limited thereto.

FIG. 10 also includes a corporate information module 67. The corporate information module 67 is contemplated to provide information to the ownship 14 that may be pertinent to the calculation of an optimal trajectory. For example, the corporate headquarters (for the company that operates the ownship 14) may designate that the ownship 14 is to arrive at the destination airport by a specified time. Separately, if a passenger is on board, for which a connection is required at the destination airport, the corporate information module 67 may send data so that the ownship 14 will arrive at the destination at an earlier time, thereby assuring that the passenger will be able to make the connecting flight.

In addition, the corporate information module 67 may be utilized by ground personnel who work for the corporate carrier. In this instance, the ground personnel may transmit a proposed trajectory for use by the aircraft 14. Here, the ground personnel may upload a proposed trajectory change to the TAP module 18. The TAP module 18 may then suggest the proposed trajectory change (assuming that there are no conflicts) to the pilot at a suitable time during the flight of the aircraft 14.

As should be apparent, the corporate information module 67 may provide any number of different types of information to the TAP module 18 to be incorporated into the calculations performed by the TAP application 30.

As discussed in greater detail below, the TAP application 30 is contemplated to operate in at least one of two modes of operation: (1) pilot-entered (i.e., manual mode) or (2) automatically selected (i.e., automatic mode). Generally, in the pilot-entered mode, the pilot is contemplated to select a particular attribute for the ownship 14. For example, the pilot may select fuel efficiency as the desired attribute either before or during the flight. If so, the TAP application 30 will optimize the trajectory of the ownship 14, taking into account the pilot-specified attribute of fuel efficiency, while avoiding traffic conflicts. Generally, in the automatic mode, the TAP application 30 will seek to optimize one or more attributes that are not pilot-entered, but are pre-selected prior to flight. In this mode of operation, the TAP application 30 will seek out trajectory changes that optimize the pre-selected attributes for the ownship 14.

As noted above, the TAP module 18 is connected to a suitable cockpit display 42 so that information pertinent to the operation of the ownship 14 may be provided to the pilot. Such information may include the results of the conflict probe of a pilot-entered trajectory change, a trajectory change modification that avoids nearby traffic, a trajectory-change opportunity (or several alternatives or ranges of maneuvers) automatically identified by the TAP application 30, the incremental fuel saved or expended relative to the current trajectory, and other desired attributes of the trajectory change. The pilot may then use this information when deciding to make a trajectory change request of ATC. The same information also is anticipated to assist the pilot in what trajectory change request to make.

The TAP application 30 also may facilitate additional functionalities. For example, the TAP application 30 may provide the function of adjusting the trajectory change request to use named waypoints or other means to facilitate voice communication of the request to an air traffic controller. This aspect of the present invention contemplates that the TAP application 30 will operate in airspace, on aircraft, or time frames where a data link is not available for transmitting trajectory change requests to ATC. Normal pilot procedures are then used to issue the trajectory change request, and normal ATC procedures are used to approve or disapprove the request. As should be apparent, therefore, the TAP module 18 imposes no required changes with respect to controller procedures, equipment, or training.

In the mode of automated monitoring for opportunities, the TAP module 18 is passive. As such, the TAP module 18, when in the automatic mode, does not require ongoing or repetitive pilot action. The TAP application 30 automatically performs a continuous assessment of opportunities for improving the performance of the flight according to any predetermined goals and/or parameters specified by the pilot prior to or during the flight.

It is contemplated, for example, that the TAP application 30, when in the automatic mode of operation, might calculate trajectories that maximize fuel efficiency. In this instance, the pilot may specify, for instance, a threshold minimum improvement (e.g., 100 lbs (45.4 kg) of fuel saved), which threshold is required to qualify as an identified opportunity worth bringing to the pilot's attention. Naturally, the trajectory change must not conflict with known traffic 22.

Other considerations in the automated optimization of the TAP module 18 include avoiding known hazards, such as weather detected onboard or uplinked from a ground service, known turbulence, and terrain. The TAP application 30 may produce recommendations to the pilot that simultaneously consider the optimization goal, the traffic, the hazards, and the ownship performance, capabilities, and limitations. The TAP application may be configured, for example, to produce a single most-optimal recommendation, a set of several alternatives, or a continuous range of maneuvers, as predetermined, selected, or requested. A list of available trajectory change options based on the pilot's pre-entered preferences would then be made available, on a continuous basis, for the pilot's immediate use.

In connection with the pilot-initiated and the automatic modes of operation of the TAP module 18, it is contemplated that the pilot may control these functions via a switch. Alternatively, the pilot may select the mode of operation via the pilot input interface 54. Similarly, any preferences set by the pilot, such as threshold limits for being notified of optimal trajectory opportunities, also may be provided via the pilot input interface 54.

In the mode of pilot-initiated use, the pilot makes manual use of the TAP module 18 and its capabilities when a trajectory change is desired, when a need is anticipated, or when the pilot is preparing a request for a trajectory change to be made at the opportune moment. In the pilot-initiated mode of operation, the TAP application 30 does not inform the pilot of potential trajectory opportunities. Instead, the pilot enters a desired trajectory change into the pilot proposed trajectory change interface 57 (shown in FIG. 14). The TAP application 30 then calculates information for a suitable trajectory change request and presents the information to the pilot via the display 42. As noted above, the pilot input interface 54 and the pilot proposed trajectory change interface 57 are contemplated to be separate interfaces. However, it is possible that the two may be combined into a single interface, such as that provided by the display 42.

Alternatively, the TAP module 18 may be connected to the Flight Management System ("FMS") 56 onboard the ownship 14. This arrangement also is illustrated in FIG. 9. In another embodiment, it is contemplated that the TAP module 18 may be incorporated into the FMS 56.

If the TAP module 18 is connected to the FMS 56, the FMS 56 may provide information to the TAP module 18 after receiving specific inputs from the pilot or the flight crew via the pilot input interface 54 or other interface available to the flight crew. In particular, if the flight crew enters data into the FMS 56 that would indicate that the flight crew is evaluating possible trajectory changes, the TAP application 30 may be programmed to respond to these inputs and provide suggested trajectory information. As before, once triggered by inputs provided by the flight crew to the FMS 56 via typical interface devices (i.e., the pilot input interface 54), the TAP application 30 evaluates potential traffic conflicts and other hazards. In addition, as before, the TAP application 30 may be coded to compute variables associated with one or more attributes of the ownship 14, including fuel savings and expenditures. The results of the computations are provided to the pilot via the display 42. If a probe or query by the flight crew results in the indication of a conflicted route, the TAP application 30 may provide a mechanism to compute a conflict-free modification to the desired trajectory change.

The TAP application 30 produces a four-dimensional (4D) trajectory prediction for each known traffic aircraft 22. A four-dimensional trajectory prediction includes the three spatial axes (i.e., x, y, and z) and time (t). The TAP application 30 acquires traffic position and (if available) trajectory data from ASC module 20 on the other aircraft 22 as well as trajectory information from ground sources. As noted above, the TAP application 30 also may receive data from external inputs 38 that relate to atmosphere/wind field information from third-party sources via internet or satellite broadcast services, for example. The TAP application 30 processes these data to maintain a dynamic record of all known aircraft 22, including the tracking of newly acquired aircraft 22, dropping of stale aircraft data when appropriate, and extrapolation of other data, when necessary. The TAP application 30 fuses data from all, relevant available sources to obtain the highest fidelity information to construct or predict the future trajectory of each traffic aircraft 22.

The TAP application 30 also correlates a trajectory for the ownship 14 and creates a 4D trajectory prediction from the aircraft's current state and intent. The TAP application 30 uses the flight plan, guidance modes, and autoflight settings to determine the state, intent, and flight mode segments for the ownship 14. The TAP application 30 uses a performance model for the ownship 14 to predict its trajectory. The TAP application 30 integrates each flight mode segment and repeats this process throughout the relevant portion of the flight to determine the complete 4D trajectory for the ownship 14. The process employed by the TAP application 30 incorporates an atmosphere model (sensed or uploaded data and predictions of wind field and temperature) and aircraft-specific performance data. The TAP application 30 accounts for combinations of different lateral and vertical flight modes (e.g., lateral navigation from the FMS, but vertical navigation using pilot autoflight settings), predicted automated transitions between modes, and monitors for changes of setting by the pilot. The TAP application 30 computes trajectory attributes, such as predicted fuel burn, for use as a baseline by the trajectory optimization function. The TAP application 30 may receive atmosphere/wind field information from third-party sources via airborne internet or satellite broadcast services, as noted above.

Figure 11:
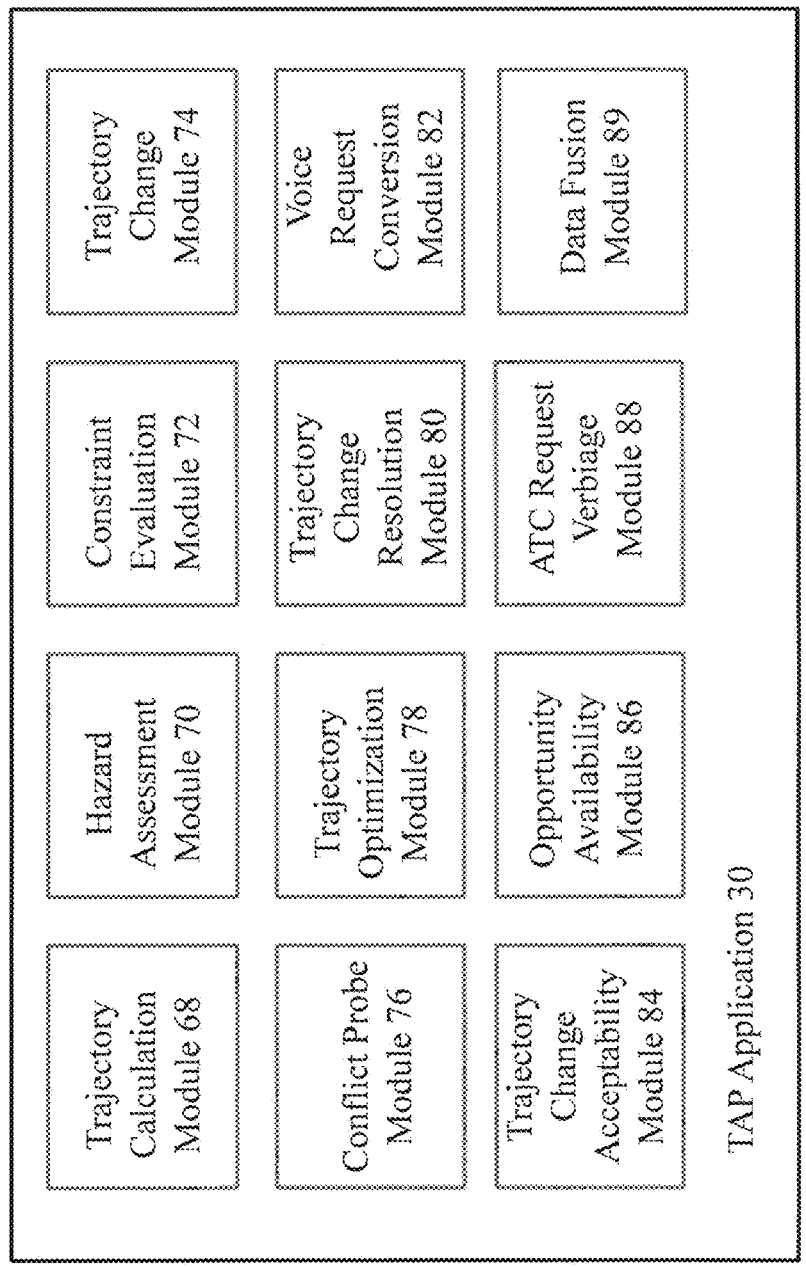
FIG. 11 is a graphical overview of one aspect of the present invention, the traffic aware planner application, which is contemplated to encompass a plurality of individual modules therein.

The TAP application 30 is contemplated to incorporate a number of separate modules, twelve of which are illustrated in FIG. 11. The individual modules are contemplated to be modules executable by software. However, any one or more of the modules may include a hardware component, as should be apparent to those skilled in the art. The twelve listed modules, which are discussed in greater detail include: (1) a trajectory calculation module 68, (2) a hazard assessment module 70, (3) a constraint evaluation module 72, (4) a trajectory change module 74, (5) a conflict probe module 76, (6) a trajectory optimization module 78, (7) a trajectory change resolution module 80, (8) a voice request conversion module 82, (9) a trajectory change acceptability module 84, (10) an opportunity availability module 86, (11) an ATC request verbiage module 88; and (12) a data fusion module 89. Still other modules may be included within the TAP application 30, as will be made apparent from the discussion that follows. In addition, any combination of modules may be implemented in the TAP application 30 without departing from the scope of the present invention.

The trajectory calculation module 68 is discussed above in connection with the generation of a 4D model of the trajectory for the ownship 14 and/or proximate aircraft 22. The trajectory calculation module 68 may receive, as input, data and information from the FMS 56 to calculate the trajectory for the ownship 14. The ASC modules 20 on proximate aircraft 22 (or a TIS-B) provide data with respect to the proximate aircraft 22 so that a map of the trajectories for the aircraft 14, 22 may be created.

The hazard assessment module 70 encompasses a subroutine (or a component) that builds and maintains a model of the hazard areas within the range and scope of a selected trajectory. Hazard areas include any regions of airspace that the ownship 14 must avoid or that the pilot prefers to avoid. Hazards may be static or may vary as a function of time. Sources of hazard area data may include onboard weather sensors (i.e., onboard weather radar 46) and predictors (i.e., onboard database 52), data-link weather information from third parties (provided as an external input 38), special use airspace restrictions as listed in the onboard database 52 (or received through a data link from an external input 38), and pilot-defined hazard areas inputted via the pilot input interface 54. (It is noted that the pilot input interface 54 also may receive information regarding pilot-inputted constraints.) The data also may include descriptors of other airspace regions for selective use by the trajectory calculation module 68 (or the trajectory optimization module 78 described below). Such descriptors include, but are not limited to high-traffic-complexity/density region predictors.

In the hazard assessment module 70, each area is specified in a numerical or geometric form, such as a polygon, with an associated hazard level indicating whether it represents a hard constraint (must be avoided) or soft constraint (prefer to avoid or minimize exposure). The hazard assessment module 70 may provide the pilot the capability to manipulate the region, for example to increase or reduce the buffer around the actual hazard, among other possible manipulations. Hazards may include any of a number of different obstacles including mountains and buildings, etc., all of which typically are surrounded by a defined safety buffer.

The constraint evaluation module 72 is a software subroutine that maintains and applies a database of constraints associated with current ATC procedures for approving trajectories. The database may be part of the onboard database 52 or a separate database altogether. Examples of procedural constraint data may include sector boundary locations, inter-sector or inter-center hand-off agreements (which specify, for example, what altitudes must be used for handing off aircraft), airspace fixes reserved for holding patterns, and prominent traffic flow directions. The constraints are used by the TAP application 30 functions that produce trajectories to ensure that the trajectory change requests do not run counter to standard procedures used by ATC.

The trajectory change module 74 monitors pilot input devices (such as the FMS 56 and the pilot input interface 54) and produces a trajectory prediction corresponding with a proposed change in flight plan, flight mode, or autoflight setting. As noted above, the inputs may be provided through a pilot input interface 54 or, depending upon the degree of avionics integration, through pilot interaction with the FMS 56 or other normal flight control interfaces. The trajectory change module 74 triggers operation of the trajectory calculation module 68, which calculates a 4D trajectory corresponding to the pilot's provisional input.

The conflict probe module 76 determines whether a selected trajectory will conflict with any traffic and/or hazard areas. The trajectories of the ownship 14 and other aircraft 22 may include buffering methods to account for maintained from traffic or hazards. A conflict is indicated if the ownship 14 (or its buffered location) is predicted to come within a specified lateral/vertical volume of any traffic aircraft 22 (or its buffered location) or breach the boundary of any hazard area. The conflict probe module 76 may be used with a single trajectory specified by the pilot for the ownship 14, multiple trajectories specified by the trajectory optimization module 78, or a "sweep" of trajectory changes defining a range of acceptable requests.

The trajectory optimization module 78 for the automated mode of operation computes one or more trajectory changes, if available, that improve desired attributes (such as fuel efficiency) of the flight. The trajectory optimization module 78 searches through a wide range of possible modifications to the current trajectory, including different lateral route patterns, cruise altitudes, and different speeds. Both immediate and delayed maneuvers are considered. The trajectory optimization module 78 takes into account trajectory constraints, including traffic, hazard areas, and crossing restrictions, returning only solutions that meet these constraints and provide sufficient buffering as specified by user settings or predetermined parameters for the ownship 14. The trajectory optimization module 78 computes desired attributes of the trajectory, such as fuel burn, and seeks the optimal value of these attributes while remaining conflict-free. The trajectory optimization module 78 may optimize multiple objectives through, for example, a weighted fitness function.

A trajectory change resolution module 80 for the pilot-initiated mode of operation of the TAP module 18 (also referred to herein as a manual mode) produces a modified trajectory based on the pilot-specified preferred trajectory that remains clear of traffic and hazards and is unlikely to be seen by ATC as producing a conflict. In searching for resolution alternatives, the trajectory change resolution module 80 may consider one or more degrees of freedom, such as vertical modifications to the desired altitude or climb/descent rate and lateral modifications to the desired track angle or route. The trajectory change resolution module 80 computes desired attributes of the trajectory, such as fuel burn, and seeks the optimal value of these attributes while remaining conflict-free. The trajectory change resolution module 80 may optimize multiple objectives through, for example, a weighted function. Variants of the trajectory change resolution module 80 may be employed with the present invention, each corresponding to strategic flight modes (i.e., flight-plan based) and tactical flight modes (i.e., pilot direct control of the autoflight system).

The voice request conversion module 82 adjusts the trajectory change request to use named waypoints or other means to facilitate voice communication of the request to ATC. Using a database (i.e., onboard database 52) of defined waypoints, navigation aids, or other shorthand conventions, the voice request conversion module 82 seeks the nearest such points that may be used to approximate the optimized or pilot-selected trajectory change with minimal loss to the trajectory's desired attributes. The voice request conversion module 82 rechecks the trajectory for conflicts and only returns trajectories that meet the original requirements.

As noted above, cockpit interface elements encompass elements such as the pilot input interface 54 and/or display 42. The pilot input interface 54 is provided for the pilot to specify and update, while in flight, the user preferences by which the TAP application 30 operates. Examples of preferences include the desired trajectory attributes for optimization (e.g., fuel efficiency), the thresholds of improvement that warrant notifying the pilot, the rate at which automated optimization is attempted, the buffers to be applied around traffic and hazard areas, and the fidelity of voice request conversion to be performed.

The pilot input interface 54 may be dedicated to the TAP module 18 or, depending on the degree of avionics integration, it may be implemented as a part of the FMS 56 and respond to input provided to the FMS 56, as discussed above.

The pilot input interface 54 responds to modifications to the flight plan, cruise altitude, or tactical flight mode settings (heading, track, speed, and vertical speed), among other attributes, associated with the trajectory for the ownship 14.

The trajectory change acceptability module 84 is provided to indicate to the pilot the results of the conflict probe, i.e., whether a pilot-specified trajectory change is sufficiently free of conflict that a trajectory change request could be made to ATC. The trajectory change acceptability module 84 may be deterministic (i.e., yes/no) or probabilistic (e.g., 85 percent estimated probability of ATC approval). The trajectory change acceptability module 84 may direct the display 42 to show, at a glance, a range of maneuvers that are likely to be acceptable to ATC.

An opportunity availability module 86 is provided to indicate to the pilot the availability of one or more trajectory optimization solutions which the pilot may consider requesting of the ATC. The opportunity availability module 86 may include the estimated improvement in one or more desired attributes of the trajectory (e.g., fuel saved). Depending on the degree of avionics integration, the availability of air/ground data links, and other variables, the opportunity availability module 86 may include the ability to load the trajectory change request in a data link message for transmission to the ATC and/or to load it in the FMS 56 for execution.

An ATC request verbiage module 88 is provided to display to the pilot the output of the voice request conversion module 82. The ATC request verbiage module 88 displays, for example, the verbiage that facilitates ATC requests made over the voice channel. The ATC request verbiage module 88 may include an estimate of the amount of time to speak the request, which the pilot may use to determine the appropriate time to make the request, given the level of frequency congestion.

The data fusion module 89 operates to combine and integrate any data from multiple sources that represent the all or part of the same information. Data are provided to the TAP module 19 via the internal inputs 34 and the external inputs 58 (or any other inputs). The data fusion module 89 takes into account each different type of data and facilitates operation of the TAP application 30, which takes the different types of data into account.

The functional operation of the present invention will now be described in connection with one or more enumerated embodiments.

Figure 12:
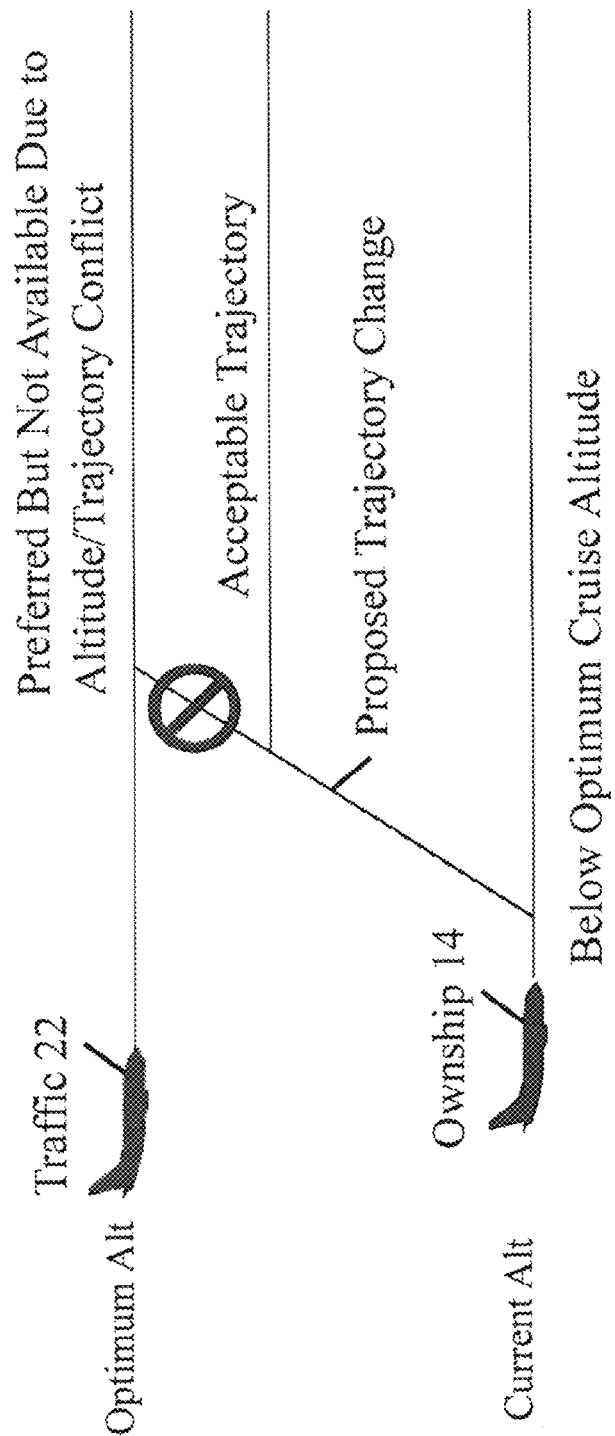
FIG. 12 is a graphical representation of the operation of the present invention, indicating a conflict associated with a change in altitude.
Figure 13:
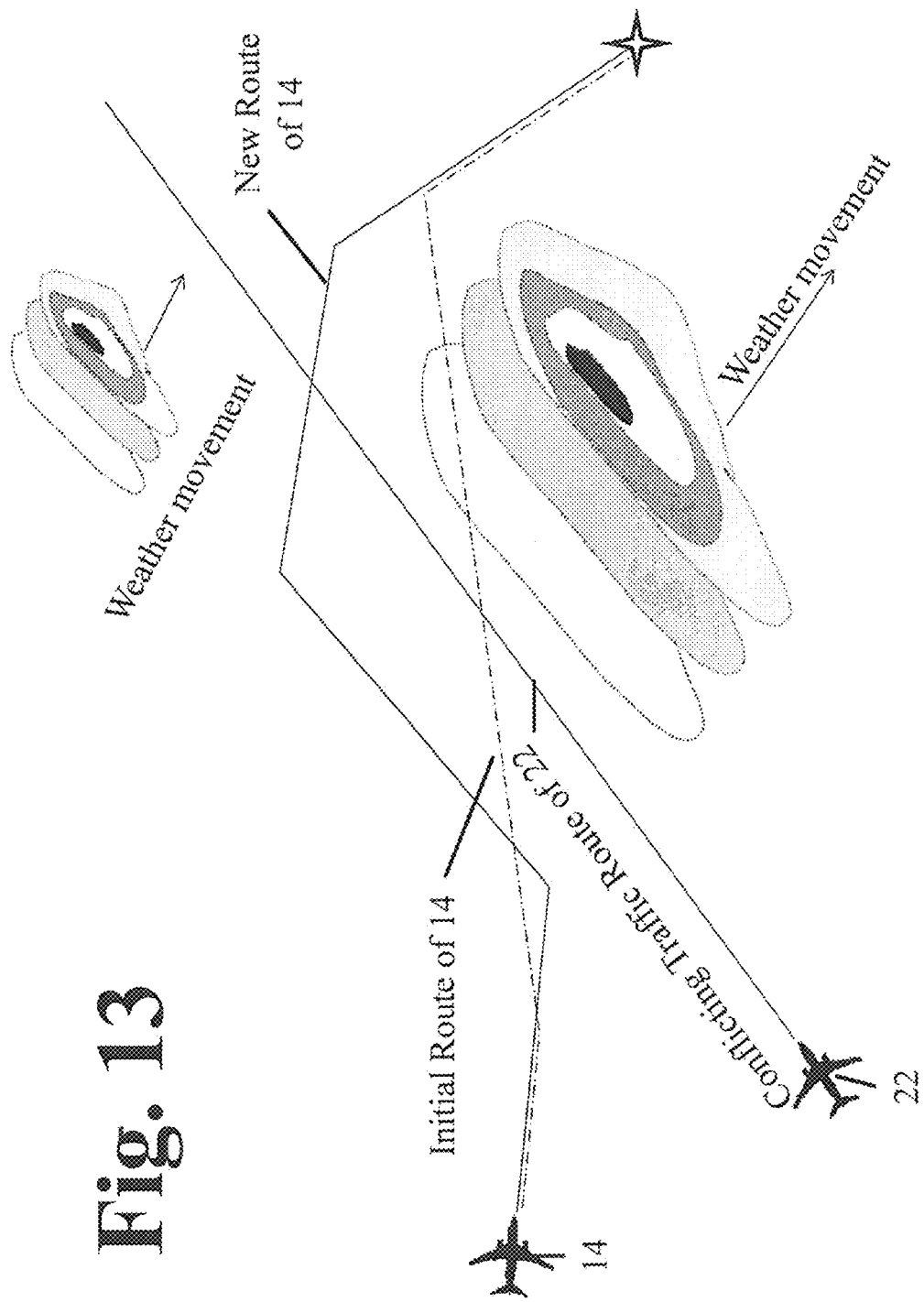
FIG. 13 is a graphical representation of the operation of the present invention, indicating resolution of a combination of trajectory and weather conflicts.

Before delving into the particulars of the functional operation of the TASAR module 12, reference is made to FIGS. 12 and 13.

FIG. 12 illustrates one contemplated operation of the present invention. In this illustration, the TAP application 30 determines that the ownship 14 may benefit (with respect to fuel efficiency). However, taking into account flight data from the traffic aircraft 22, the TAP application 30 determines that there is a conflict with the flight path of the aircraft 22 (whether the aircraft 22 is TASAR-equipped or not). Therefore, the TAP application 30 determines that a request made to ATC to increase the altitude of the ownship 14 is likely to be denied. The TAP application 30 then determines the greatest altitude increase for the ownship 14 that does not result in a conflict with traffic 22. This altitude change request is more likely to be granted. The requested change is the most optimal trajectory for the ownship 14 that the controller also deems acceptable to fly, as indicted in FIG. 12.

FIG. 13 illustrates the operation of the TASAR module 12 to calculate a new route for the ownship 14 to avoid a flight conflict with traffic aircraft 22 and to avoid two illustrated weather hazards. In the example, TASAR-equipped aircraft 14 was on schedule prior to movement of convective weather into its planned flight path. The aircraft was rerouted around the weather, and the extended path (initial route of 14) resulted in a delay in its predicted arrival over its next waypoint. The weather is slowly clearing out of the way, and the crew of the TASAR-equipped aircraft 14 would like to make up as much of this lost time as possible. There is traffic in proximity, and crossing traffic (22) constrains a simple direct-to-fix replanning solution. The flight crew therefore uses TAP to compute a conflict-free, weather-avoiding, path that saves flight time. The new path (new route of 14) also saves fuel, but is optimized to save time based on TAP's pilot optimization preference inputs. As noted above and as discussed in greater detail below, the TAP module 18 takes into account a wide variety of different data to calculate the new route for the ownship 14.

It is noted that the present invention contemplates that use of the TAP module 18 is completely optional. As should be apparent, the TAP application 30 is contemplated to provide only advisory information. In other words, the TAP module 18 is not contemplated to take control of the ownship 14. The pilot remains the sole person authorized to make ATC requests, with or without assistance from the TAP module 18.

The pilot procedure for the automatic mode of operation, encompassing automated monitoring for opportunities, will now be described.

Pilot procedures for TASAR in the automatic mode of operation are mostly passive. The pilot activates the TAP application 30 in this mode for any segment of the flight where opportunity advisories are desired. For those segments where advisories are not desired, such as times when the pilot determines that no requests will be made (e.g., airspace is too congested), the pilot deactivates this mode of the TAP application 30. Prior to activation, or at any time after activation, the pilot sets or updates the user preference settings. For example, the pilot may change the criteria for route optimization. During the flight, while the mode is active, the TAP application 30 periodically probes for trajectory opportunities. When one or more opportunities are identified that meet or exceed the criteria, the TAP application 30 notifies the pilot and displays the recommend trajectory change(s) and supplemental information to aid the pilot's decision (e.g., estimated flight time saved). The TAP application 30 displays verbiage to communicate the request expeditiously to ATC and, depending on the degree of avionics integration, provides the option to load the request into a data link message. Final procedures (specified below) are then followed.

Pilot procedures for TASAR in the manual mode of operation are relatively passive, although depending on the degree of avionics integration, may involve data entry to the pilot proposed trajectory change interface 57 that provides input to the TAP application 30. During the flight, when the pilot identifies a need or desire to make a trajectory change request to ATC, the pilot uses the TAP application 30 to probe the desired change prior to making the request. The pilot enters the desired trajectory change either directly through the pilot proposed trajectory change interface 57 or through existing flight control systems of the aircraft that are monitored by the TAP application 30, such as the FMS 56. The TAP application 30 probes the desired change for traffic conflicts and displays the results of the probe to the pilot. If a conflict is predicted on the desired trajectory change, the TAP application 30 computes and displays one or more alternative modifications that meet user preference criteria. The TAP application 30 issues a signal to display (by the display 42) verbiage to communicate the request expeditiously to ATC and, depending on the degree of avionics integration, provides the option to load the request into a data link message. Final procedures (specified below) are then followed.

Final pilot procedures for automatic and manual modes of operation are now described.

Once the preceding procedures are complete, the pilot then uses normal procedures (voice or data link) to make the trajectory change request to ATC, including determining the appropriate time to make the request. The pilot is not obligated to make the request as specified by the TAP application 30, nor make any request at all. The information from the TAP application 30 is contemplated to be advisory only. When a request to ATC is made, no reference to the TAP application 30 or the TASAR module 12 is required, since no special consideration by ATC is being requested. The pilot proceeds as instructed by ATC's response.

Alternate embodiments of the present invention, as discussed above, will now be discussed.

The TAP application 30 is contemplated to be a tool for pilots and, therefore, is likely to be located in the cockpit. Several embodiments of this cockpit integration are contemplated, most involving an existing or a new platform, such as an Electronic Flight Bag ("EFB"), to host the TASAR module 12.

A Class 1 EFB is now described in connection with the present invention. In its simplest form, the TAP application 30 may be hosted on a Class 1 EFB. A Class 1 EFB is a stand-alone platform not integrated with aircraft systems (other than power). ADS-B data and ownship position may be communicated to the Class 1 EFB over a wireless network, and additional information from ground sources such as Nexrad weather data and supplemental traffic information may similarly be acquired using airborne internet access. The minimal certification level of Class 1 EFBs makes this the lowest cost option to provide TAP modules 18 to aircraft 14, 22. However, the benefits associated with the TAP module 18 are likely to be minimal given the lack of interaction with the aircraft's flight plan and flight control interfaces.

Implementation of the TAP module 18 with a Class 2 EFB permits the TAP application 30 to have direct, read-only access to data from the aircraft's systems, such as the FMS 56 and associated flight control interfaces. Since the Class 2 EFB is physically mounted in the cockpit, access by the pilot is more convenient. Therefore, the TAP application 30 is more likely to be used and provide benefit to the ownship 14. In this configuration, the TAP module 18 has access to aircraft system data, such as the aircraft's flight plan. Access to this data is contemplated to enhance significantly the ability of the TAP module 18 to optimize the route of flight. Moreover, Class 2 EFBs are generally a suitable economic choice, given their relatively low certification level.

The third option for the TAP module 18 is to host the TAP application 30 on a Class 3 EFB, or equivalently, integrate the TAP application 30 capabilities fully into an existing aircraft system such as the FMS 56. The advantage of full integration is the ability to send trajectory solutions generated by the TAP application 30 back to the aircraft system to data link to ATC and for loading the solutions directly into the FMS 56 and/or placement on forward-field-of-view displays. This connection to aircraft systems would significantly increase the benefits provided by the TAP module 18 by making available to the pilot a far more diverse and flexible set of trajectory change options. These may include complex reroutes, multi-step altitude changes, and combined maneuvers. Given the high certification level of integrated avionics, including Class 3 EFBs, this option is anticipated to be the most expensive option.

The following peripheral equipment is contemplated to be supportive of the TAP module 18.

A source of real-time traffic surveillance information may be required for operation of the TAP module 18, as discussed above. If so, the primary source of real-time traffic surveillance information is expected to be the ASC module 20, providing position information directly from the onboard systems of nearby aircraft 22. In addition to the ASC module 20, the TAP module 18 may operate using ground sources of traffic surveillance information, received through TIS-B, or from third-party sources via airborne internet or satellite broadcast services. The information is supplied to the application processor aboard the physical host of the TAP application 30.

The TAP application 30, when implemented as software, requires a physical host, most likely an EFB or other existing cockpit system, as discussed above. The EFB contains the application processor for the TAP application 30, and it provides a pilot interface for entering preferences, receiving notices, and viewing results. The TAP application 30 requires access to a current navigation database, such as the onboard database 52. If the EFB is Class 2 or 3, a connection to the aircraft's other avionics systems should be provided by the EFB installation, as should be apparent to those skilled in the art.

The TAP module 18 is not contemplated to provide a safety-critical function, nor is it expected to affect the safety of the flight. It is contemplated that pilots will rely on the TAP module 18 to make more informed trajectory change requests to ATC. However, the safety of the trajectory change with respect to traffic aircraft 22 remains entirely with ATC. The TAP module 18 is not contemplated to provide new authorization for the pilot to act without ATC approval. Since no operational credit is expected from the TAP module 18, operation of the TAP module 18 should not result in the aircraft flying trajectories it wouldn't otherwise already be authorized to fly. Even in Class 3 implementations, the TAP application would not be expected to fly the aircraft 14, 22. Rather, the TAP application 30 will merely supply an ATC-and-pilot approved trajectory to the FMS 56, and the existing capabilities under control of the pilot would follow the new trajectory.

The TAP application 30 is contemplated to rely on a navigation database, such as the onboard database 52. The TAP application also is contemplated to require periodic updates to maintain current information. These updates may be provided on the same schedule as those used for primary navigation.

The operational performance of the TAP module 18 may benefit from access to additional sources of information that affect ATC acceptance of trajectory requests. An example may be a database of ATC sector boundaries and handoff agreements (e.g., aircraft must transition between sectors at a certain altitude). As these requirements change over time, periodic updates are expected to be required.

One desirable aspect of the TAP module 18 is the use of the ASC module 16 and the surveillance data available on board the aircraft 14, 22. This includes the use of the ASC module 16 for aircraft-specific performance-based trajectory optimization to enhance current-day operations with: (a) no changes to ATC procedures or equipment, (b) no requirement to display traffic aircraft to the pilot, and (c) correspondingly low certification requirements and, therefore, cost. The TAP application 30 is also unique in that it benefits each equipped aircraft 14, 22. However, as should be apparent from the foregoing, it is not necessary for other aircraft 22 to be equipped with a TAP module 18, because the ownship 14 may receive pertinent data from external sources 38 for operation of the TAP module 18. The TAP module 18 takes advantage of the growing availability of broadcasts from ASC modules 16, supplemented by other ground-based sources of traffic data, as well as unique on board sources of information such as weather radar, flight control settings, and real-time weight and balance not available outside the aircraft 14, 22.

One desirable aspect of the present invention is that the TAP application 30 is easily tailored to the particular optimization objectives of each flight and may be used as often or seldom as the pilot chooses. As experience with the TAP module 18 develops for a particular type of operation, highly customized versions of the TAP application 30 may be created, and the capabilities and installation schedule need not be synchronized across different operators, as would be the case for ground-based flight optimization tools.

Figure 14:
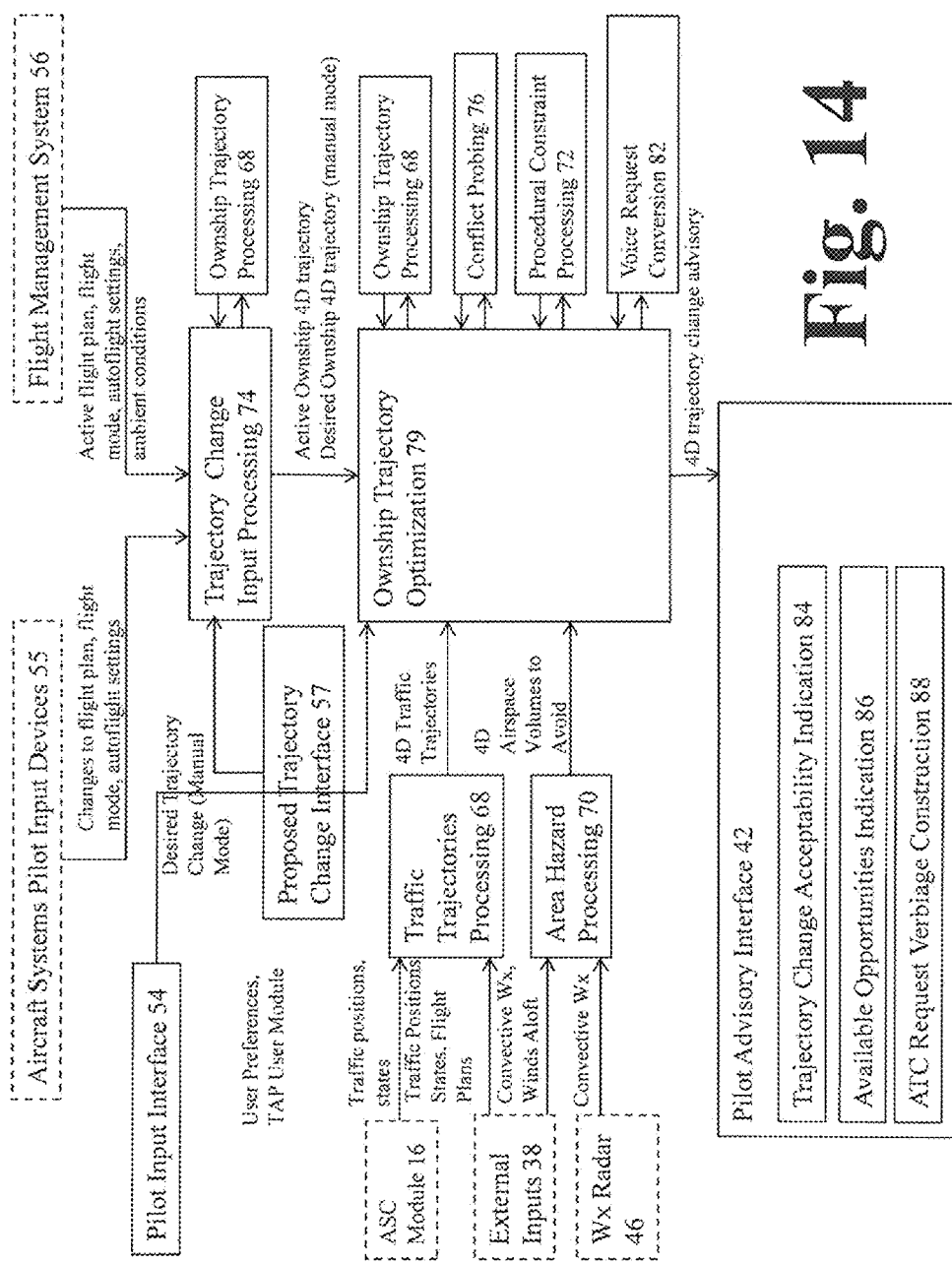
FIG. 14 is a graphical representation of one contemplated overview for the present invention, providing a pictorial summary of aspects of the present invention.

Reference is now made to FIG. 14, which provides an overview of one contemplated embodiment of the present invention. The overview provided in FIG. 14 illustrates the interaction of the various components described above.

As illustrated in FIG. 14, input from aircraft systems pilot input devices 55 is provided to the trajectory change input processing module 74 in the form of changes to the flight plan, flight mode, and autoflight setting, among other parameters. Input from the FMS 56 also is received by the trajectory change input processing module 74 in the form of active flight plan data, flight mode data, autoflight settings, and ambient conditions, among other data parameters. The trajectory change input processing module 74 also interfaces with the trajectory calculation module 68, which provides information concerning the trajectory of the ownship 14. Also, input from the proposed trajectory change interface 57 is provided to the trajectory change input processing module 74 in the form of desired trajectory changes of the type inputted by the pilot in the manual mode of operation.

Output from the trajectory change module 74 is then provided to the ownship trajectory optimization module 79 in the form of, inter alia, active ownship 4D trajectory data and desired ownship 4D trajectory data (in the manual mode of operation), among other parameters. The ownship trajectory optimization module 79 is contemplated to combine the trajectory optimization module 78 and the trajectory change resolution module 80.

As illustrated in FIG. 14, the ownship trajectory optimization module 79 receives input from a variety of different sources. For example, the pilot input interface 54 provides, as input, pilot preference information. The trajectory calculation module 68 provides, as input, trajectories of aircraft traffic 22, specifically 4D traffic trajectories. The hazard assessment module 70 provides, as input, information regarding 4D airspace volumes to avoid. The trajectory calculation module 68 also provides trajectory information regarding the trajectory of the ownship 14. The conflict probe module 76 provides input in the form of conflict probes, as discussed above. The constraint evaluation module 72 provides input in the form of procedural constraints. In addition, the voice request conversion module 82 provides input regarding voice request conversion.

The trajectory optimization module 78 outputs data in the form of 4D trajectory change advisory information. The trajectory change advisory information is provided, as input, to the pilot advisory interface, such as the display 42. The display 42, then provides to the pilot the output in the form of trajectory change acceptability assessment and indication information 84, opportunity available indication information 86, and ATC request verbiage construction information 88.

As should be apparent, the overview provided by FIG. 14 is but one contemplated embodiment of the present invention and is not intended to be limiting of the present invention.

FIGS. 15-18 illustrate one method of the present invention, which is now described.

Figure 15:
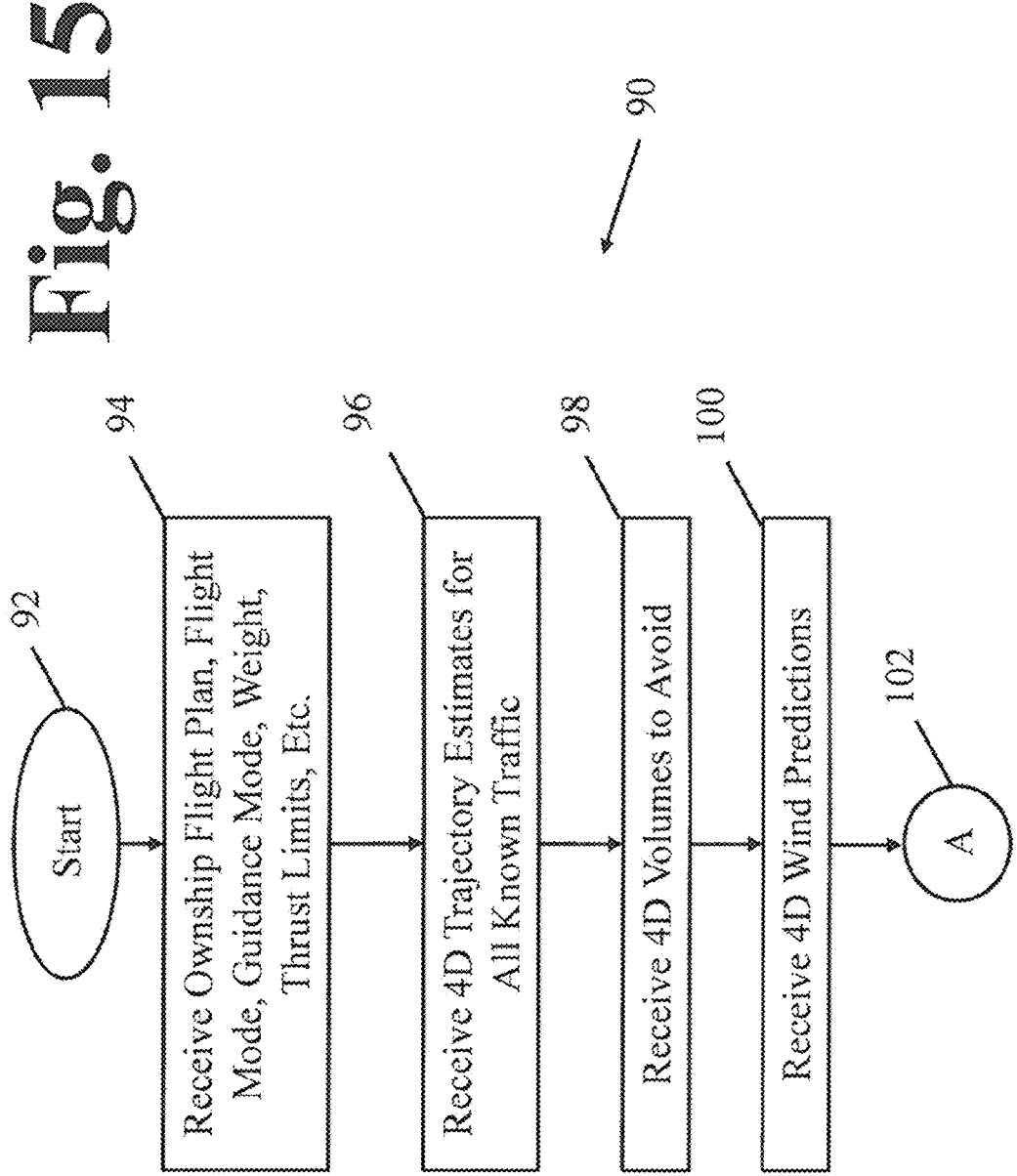
FIG. 15 is a graphical representation of a first part of one contemplated embodiment of a method according to the present invention.

With reference to FIG. 15, the method 90 of the present invention begins at a start 92.

From the start 92, the method 90 proceeds to step 94, where the method 90 receives ownship flight plan, flight mode, weight, and thrust limit information, among other information. The data received at step 94 is contemplated to be received from one or both of the internal inputs 34 and the external inputs 38, as discussed above.

The method 90 then proceeds to step 96, where the method receives 4D trajectory estimates for all known traffic aircraft 22. In step 96, for each traffic aircraft 22, the trajectory estimate may consist of current positions and future waypoints of the traffic aircraft 22. Specifically, latitude, longitude, altitude, and times of arrival for the traffic aircraft 22 may be provided. It is assumed that the traffic aircraft 22 fly in a straight line between the waypoints. However, variations in the flight paths (i.e., accurate flight path variations) for the traffic aircraft 22 also may be taken into account.

From step 96, the method 90 proceeds to step 98, where the method 90 receives data regarding 4D volumes to avoid. The 4D volumes to avoid include, but are not limited to 4D spatial volumes associated with hazards, for example. With respect to the 4D spatial volumes, each volume is defined generally as a two dimensional polygon having upper and lower altitude boundaries. The 4D spatial volumes may be more complex, as they may include multiple volumes that are connected to (or associated with) one another.

The method 90 then proceeds to step 100, where the method 90 receives 4D wind predictions (including no wind predictions, which are treated as zero for purposes of the calculations). In association with step 100, the 4D wind predictions may encompass a three dimensional gridded map of wind vectors (i.e., velocity and direction) for each point in time.

The method then proceeds to step 104. For purposes of illustration, the connector 102 is provided in FIG. 15. The connector 102 is merely a connector between the portion of the method 90 illustrated in FIG. 15 and the continuation of the method 90 provided in FIG. 16.

Figure 16:
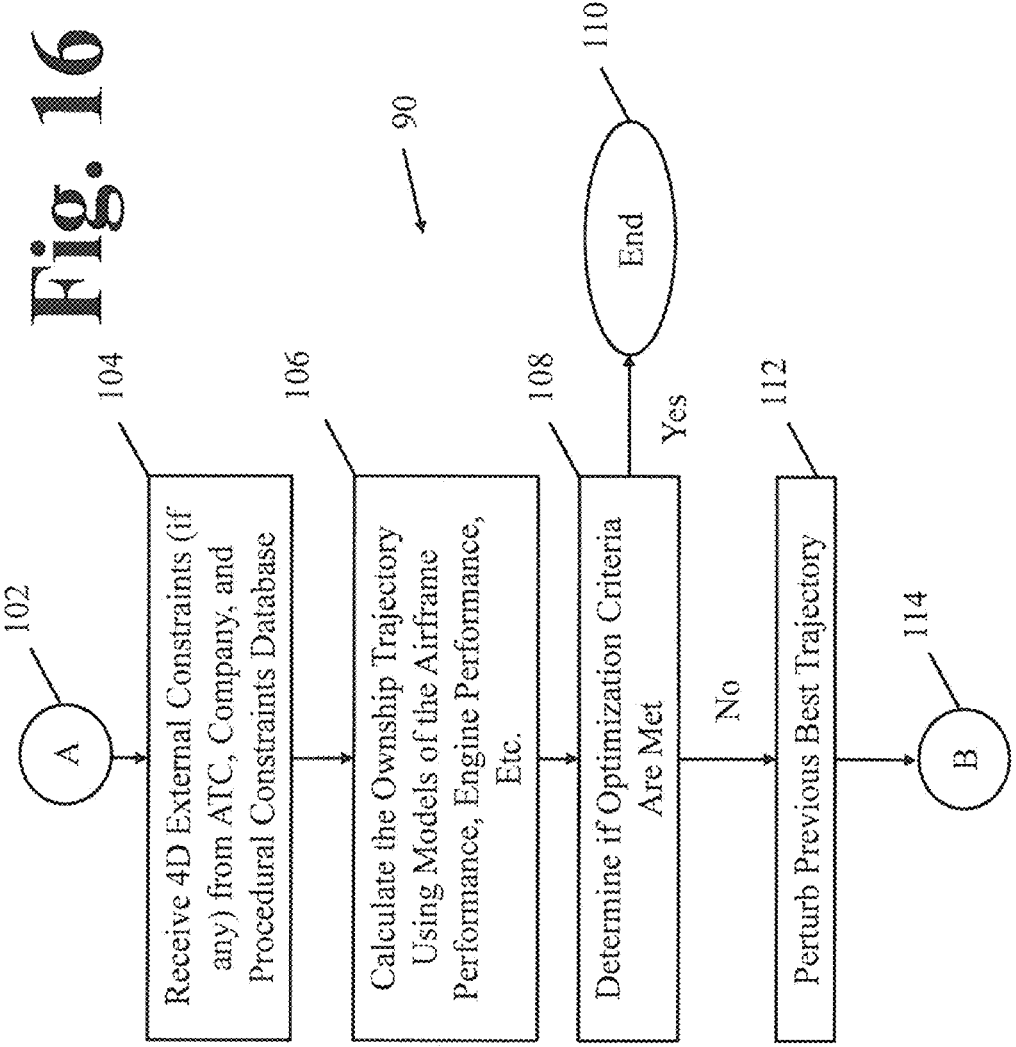
FIG. 16 is a graphical representation of a second part of the method.

With reference to FIG. 16, the method 90 continues at step 104. In step 104, the method receives 4D external constraints (if any) from ATC, the company operating for the ownship 14, and any procedural constraints (i.e., the ownship shall not approach a traffic aircraft 22 closer than a predetermined distance). One example of an ATC constraint encompasses a required speed and altitude at a fixed arrival point in the path of the ownship 14.

The method 90 then proceeds to step 106. At step 106, the method 90 calculates the trajectory of the ownship 14 using models of the airframe performance, engine performance, wind fields, and pilot-selected guidance variables, among other variables. Suitable external trajectory constraints are taken into account in step 106. This is a trajectory equivalent to the trajectory that the ownship's guidance system uses as a reference to guide the ownship 14 while in an automatic flight mode. One or more iterations may be employed at this step 106 to generate a trajectory that complies with applicable constraints.

The method 90 then proceeds to step 108. At step 108, the method 90 determines if optimization criteria are met. If optimization criteria are met, the method 90 outputs the optimized, non-conflicting trajectory and ends at step 110. If the optimization criteria are not met, the method 90 proceeds to step 112.

At step 112, the method 90 perturbs the trajectory of the ownship 14. The trajectory that is perturbed is the previous best trajectory for the ownship 14. In this step 112, it is contemplated to use a genetic algorithm approach to develop a generation of several perturbation trajectories based on the parent trajectories. The genetic algorithm approach is but one contemplated approach to step 112 and should not be considered as limiting of the present invention. Other approaches, as should be apparent to those skilled in the art, may be employed without departing from the scope of the present invention.

The method 90 then transitions, via the connector 114, to the next portion of the method that is illustrated in FIG. 17.

With reference to FIG. 17, the method 90 proceeds from step 112 to step 116. At step 116, the method 90 adjusts the perturbed trajectory so that the perturbed trajectory is compatible with a voice request. This step 116 involves, inter alia, moving the trajectory change points to the nearest named fix, for example.

The method 90 then proceeds to step 118. At step 118, the method 90 evaluates the perturbed trajectory for interference with conflicts. If there are conflicts, the method 90 returns to step 112. If there are no conflicts, the method 90 proceeds to step 120.

At step 120, the method 90 determines if the perturbed trajectory is within the performance envelope of the ownship 14. In other words, this step 120 asks if the ownship 14 is flyable along the perturbed trajectory. If the ownship 14 is not flyable along the perturbed trajectory, the method 90 returns to step 112. If the ownship 14 is flyable along the perturbed trajectory, the method 90 proceeds to step 124. As a matter of reference, the approach employed in this step 120 is contemplated to be the same approach applied in step 106.

The connector 122 denotes the transition from FIG. 17 to FIG. 18.

With reference to FIG. 18, the method 90 continues at step 124. At step 124, the method 90 compares the perturbed trajectory to the previous best trajectory using an objective fitness function. Here, the pilot may select parameters of the fitness function to choose what objectives are most important. For example, the pilot may select minimum fuel required or minimum flight time, among other parameters.

The method 90 then proceeds to step 126. At step 126, the method 90 queries if the perturbed trajectory is superior to the previous best trajectory. If so, the method 90 proceeds to step 128. If not, the method returns to step 108.

At step 128, the method 90 sets the perturbed trajectory as the new best trajectory. Following step 128, the method 90 returns to step 108.

As should be apparent to those skilled in the art, there are numerous variations of the method 90 that may be employed. Those variations are intended to fall within the scope of the present invention.

As should be apparent from the foregoing, various embodiments of the present invention have been described. These embodiments are intended to be illustrative of the present invention and not limiting thereof. To the contrary, those skilled in the art should appreciate variations and equivalents of the embodiments described herein. Those variations and equivalents are intended to be encompassed by the present patent application.

What is claimed as new and desired to be secured by Letters Patent of the United States is:

1. An apparatus for generating at least one flightoptimizing trajectory for a first aircraft, comprising:
   a receiver at least capable of receiving second trajectory information associated with at least one second aircraft;
   a traffic aware planner (TAP) module operably connected to the receiver to receive the second trajectory information;
   at least one internal input device operably connected to the TAP module on board the first aircraft to provide first trajectory information associated with the first aircraft; and
   a TAP application capable of calculating an optimal trajectory for the first aircraft based at least on the first trajectory information and the second trajectory information, wherein the optimal trajectory at least avoids conflicts between the first trajectory information and the second trajectory information.

2. The apparatus of claim 1, further comprising an aircraft surveillance and communication (ASC) module in communication with the TAP module, wherein the receiver is incorporated into the ASC module.

3. The apparatus of claim 1, wherein the ASC module is disposed on the first aircraft.

4. The apparatus of claim 1, wherein the TAP module is disposed on the first aircraft.

5. The apparatus of claim 1, wherein both the ASC module and the TAP module are disposed on the first aircraft.

6. The apparatus of claim 1, wherein the ASC module comprises automatic dependent surveillance broadcast (ADS-B) module.

7. The apparatus of claim 1, further comprising a transmitter, permitting transmission of first trajectory information associated with the first aircraft.

8. The apparatus of claim 7, wherein the transmitter is integral with the ASC module.

9. The apparatus of claim 1, wherein the at least one internal input device is selected from the group consisting of an onboard weather radar, a turbulence sensor, an onboard terrain sensor, an onboard database, a pilot input interface, and a flight management system.

10. The apparatus of claim 1, further comprising at least one external input device operably connected to the TAP module.

11. The apparatus of claim 10, wherein the at least one external input device is selected from a group comprising a global positioning system (GPS) station, a OPS satellite, a positional data station, a weather station, an traffic data station, an aircraft data station, and a corporate information module.

12. The apparatus of claim 1, wherein the TAP module comprises at least one selected from the group consisting of a trajectory calculation module, a hazard assessment module, a constraint evaluation module, a trajectory change module, a conflict probe module, a trajectory optimization module, a trajectory change resolution module, a voice request conversion module, a trajectory acceptability module, an opportunity availability module, an ATC request verbiage module, and a data fusion module.

13. A method for generating at least one flight optimizing, trajectory for a first aircraft, comprising:
   (1) inputting an optimization criteria for the first aircraft into a traffic aware planner (TAP) application housed in a TAP module;
   (2) receiving flight data for the first aircraft with at least one internal input device operably connected to the TAP module;
   (3) receiving one or more of the following data with at least one external input device operably connected to the TAP module: at least one four dimensional (4D) trajectory estimate for at least one second aircraft; at least one 4D volume to avoid by the first aircraft; at least one 4D wind prediction; and/or at least one 4D external constraint;
   (4) calculating and generating the at least one flight optimizing trajectory for the first aircraft with the TAP application based on the optimization criteria and the data received in steps (2) and (3).

14. The method of claim 13, wherein the flight data comprises at least one selected from the group consisting of flight plan data, flight mode data, guidance mode data, weight, and thrust limits for the first aircraft.

15. The method of claim 13, wherein the at least one 4D trajectory estimate comprises a plurality of 4D trajectory estimates, one for each second aircraft.

16. The method of claim 13, wherein the 4D volume to avoid comprises a plurality of 4D volumes to avoid.

17. The method of claim 16, wherein the plurality of 4D volumes to avoid comprise at least weather.

18. The method of claim 13, wherein the at least one 4D external constraint comprises at least one selected from the group consisting of an external constraint from air traffic control, an external constraint imposed by the carrier for the first aircraft, and an external procedural constraint.

19. The method of claim 13, wherein the optimization criteria comprises at least one of fuel efficiency of the first aircraft and minimum travel time to destination.

20. The method of claim 13, further comprising, if optimization criteria are not met:
   (5) perturbing a previous best trajectory for the first aircraft to generate a perturbed trajectory for the first aircraft;
   (6) adjusting the perturbed trajectory to be compatible with at least one voice request;
   (7) evaluating the perturbed trajectory to determine if conflicts with the perturbed trajectory exist;
   (8) if conflicts with the perturbed trajectory exist, returning to step (5).

21. The method of claim 20, further comprising, if conflicts with the perturbed trajectory do not exist:
   (9) determining if the perturbed trajectory is within an operational envelope of the first aircraft;
   (10) if the perturbed trajectory is not within the operational envelope of the first aircraft, returning to step (5).

22. The method of claim 21, further comprising, if the perturbed trajectory is within the operational envelope of the first aircraft;
   (11) comparing the perturbed trajectory to the previous best trajectory for the first aircraft;
   (12) determining if the perturbed trajectory is superior to the previous best trajectory; and
   (13) if the perturbed trajectory is not superior to the previous best trajectory, returning to step (5).

23. The method of claim 22, wherein the comparison of the perturbed trajectory to the previous best trajectory for the first aircraft is performed using a fitness function.

24. The method of claim 22, further comprising, if the perturbed trajectory is superior to the trajectory or the previous best trajectory:
   (14) setting the perturbed trajectory as the best trajectory; and
   (15) returning to step (5).

* * * * *